United States Patent
Fuchie

(10) Patent No.: US 7,558,465 B2
(45) Date of Patent: Jul. 7, 2009

(54) INFORMATION PROCESSING APPARATUS AND INFORMATION PROCESSING METHOD, RECORDING MEDIUM, AND PROGRAM

(75) Inventor: Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 11/207,826

(22) Filed: Aug. 22, 2005

(65) Prior Publication Data

US 2006/0045188 A1    Mar. 2, 2006

(30) Foreign Application Priority Data

Aug. 25, 2004  (JP)  ............................. 2004-245375

(51) Int. Cl.
*H04N 5/93* (2006.01)
(52) U.S. Cl. .......................... 386/52; 386/111; 386/109; 386/125; 386/126; 386/95
(58) Field of Classification Search ................. 386/125, 386/126, 111, 46, 95, 52, 109
See application file for complete search history.

(56) References Cited

U.S. PATENT DOCUMENTS 6,141,358 A * 10/2000 Hurst et al. .................. 370/543
6,567,471 B1 * 5/2003 Yoshinari ................ 375/240.26
7,209,635 B2 * 4/2007 Hatabu ........................ 386/52

FOREIGN PATENT DOCUMENTS

| JP | 10-155156 | 6/1998 |
| JP | 2000-188759 | 7/2000 |
| JP | 2001-54110 | 2/2001 |
| JP | 2002-125232 | 4/2002 |

OTHER PUBLICATIONS

U.S. Appl. No. 11/207,826, filed Aug. 22, 2005, Fuchie.
U.S. Appl. No. 11/207,899, filed Aug. 22, 2005, Fuchie.

* cited by examiner

*Primary Examiner*—Thai Tran
*Assistant Examiner*—Helen Shibru
(74) *Attorney, Agent, or Firm*—Oblon, Spivak, McClelland, Maier & Neustadt, P.C.

(57) ABSTRACT

An information processing apparatus and method is disclosed by which an encoder having no reference picture inputting function can be used to edit compressed image data of the Open GOP structure. First and second non-compressed image signals each obtained by decoding a predetermined section including an editing point set to compressed image data are joined at the editing points to produce a third signal. The third signal is re-encoded to produce re-encoded image data using, as reference pictures to be used to re-encode B pictures at the top and the last of the third signal, data obtained by re-encoding the third signal corresponding to each of the reference pictures as an I or P picture and decoding the re-encoded I or P picture in the inside of the encoder.

15 Claims, 13 Drawing Sheets

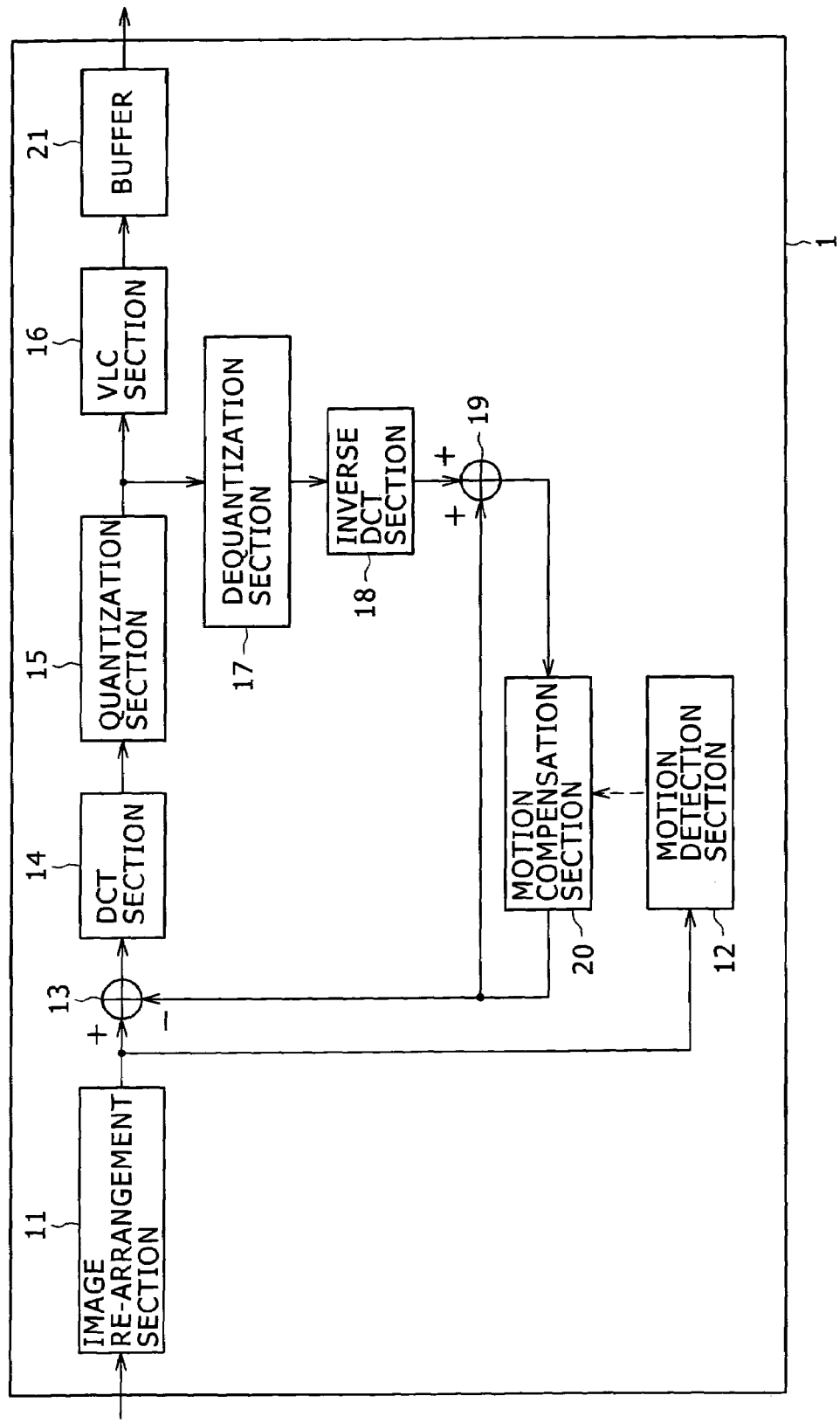
F I G . 1

INFORMATION PROCESSING APPARATUS AND INFORMATION PROCESSING METHOD, RECORDING MEDIUM, AND PROGRAM

CROSS REFERENCES TO RELATED APPLICATIONS

The present invention contains subject matter related to Japanese Patent Application JP 2004-245375 filed in the Japanese Patent Office on Aug. 25, 2004, the entire contents of which being incorporated herein by reference.

BACKGROUND OF THE INVENTION

This invention relates to an information processing apparatus and an information processing method, a recording medium, and a program, and more particularly to an information processing apparatus and an information processing method, a recording medium, and a program suitable for use where video data compressed bidirectional interframe prediction are edited.

In order to edit an MPEG (Moving Picture Coding Experts Group/Moving Picture Experts Group) stream, a technique is conventionally used wherein pictures in the proximity of an editing point (splicing point) are decoded once and resulting non-compressed image signals are joined together at the editing point, whereafter the resulting signal is re-encoded. The technique is disclosed, for example, in International Publication No. WO99/05864 (hereinafter referred to as Patent Document 1).

In the MPEG system, a compression coding system which uses bidirectional interframe prediction and involves I pictures, P pictures and B pictures is called compression of the Long GOP (Group Of Pictures) system.

An I picture is an interframe coded picture coded independently of any other picture, and an image can be decoded from information only of an I picture. A P picture is an interframe forward predictive coded picture represented by a difference from a preceding frame (in the forward direction) with respect to time. A B picture is a bidirectional predictive coded picture coded by motion compensation interframe prediction making use of preceding (in the forward direction), succeeding (in the reverse direction) or preceding and succeeding (in the opposite directions (bidirectional)) pictures with respect to time.

Since the P picture and the B picture have a smaller data amount than the I picture, if the GOP is made longer (that is, if the number of pictures which form a Long GOP is increased), then the compression ratio of the image can be raised. Therefore, the P picture and the B picture are suitable for utilization in digital broadcasting applications and DVD (Digital Versatile Disk) video applications. However, if the GOP is excessively long, then the editing control in the frame accuracy becomes difficult, and a problem in operation takes place in editing in business applications.

An encoder which is conventionally used widely is shown in block diagram in FIG. 1.

Referring to FIG. 1, the encoder 1 shown includes an image re-arrangement section 11 which re-arranges frame images of image data successively inputted thereto as occasion demands or divides frame images of image data into macro-blocks each formed from luminance signals of 16 pixels×16 lines to produce macro-block data. The image re-arrangement section 11 supplies the produced macro-block data to an arithmetic operation section 13 and a motion detection section 12.

The motion detection section 12 receives the macro-block data as an input thereto, calculates motion vectors of the individual macro-blocks and signals the motion vectors as motion vector data to a motion compensation section 20.

The arithmetic operation section 13 performs motion compensation for the macro-block data supplied thereto from the image re-arrangement section 11 based on the image types of the macro-blocks. More particularly, the arithmetic operation section 13 performs motion compensation for the I picture using the intra-prediction mode, performs motion compensation for the P picture using the forward prediction mode, and performs motion compensation for the B picture using the bidirectional prediction mode.

Here, the intra-prediction mode is a method wherein a frame image of an object of encoding is used as it is as transmission data. The forward prediction mode is a method wherein predictive residuals between a frame image of an object of encoding and a reference image in the past are used as transmission data. The bidirectional prediction mode is a method wherein predictive residuals between a frame image of an object of encoding and reference images in the past and in the future are used as transmission data.

First, if macro-block data represent an I picture, then the macro-block data are processed using the intra-predictive mode. In particular, the arithmetic operation section 13 signals a macro-block of the macro-block data inputted thereto as it is as arithmetic operation data to a DCT (Discrete Cosine Transform) section 14. The DCT section 14 performs a DCT transform process for the arithmetic operation data inputted thereto into DCT coefficients and signals the DCT coefficients as DCT coefficient data to a quantization section 15.

The quantization section 15 performs a quantization process for the DCT coefficient data inputted thereto and signals resulting quantized DCT coefficient data to a VLC (Variable Length Code) section 16 and a dequantization section 17.

The quantized DCT coefficient data signaled to the dequantization section 17 undergo a dequantization process with a quantization step size equal to that used in the quantization section 15 by the dequantization section 17 and are signaled as DCT coefficient data to an inverse DCT section 18. The inverse DCT section 18 performs an inverse DCT process for the DCT coefficient data supplied thereto and signals resulting data to an arithmetic operation section 19.

On the other hand, if the macro-block data represent a P picture, then the arithmetic operation section 13 performs a motion compensation process according to the forward prediction mode for the macro-block data, but if the macro-block data represent a B picture, then the arithmetic operation section 13 performs a motion compensation process according to the bidirectional prediction mode for the macro-block data.

In the forward prediction mode, the motion compensation section 20 performs motion compensation in accordance with the motion vector data supplied thereto from the motion detection section 12 to calculate forward prediction picture data or bidirectional prediction picture data. The arithmetic operation section 13 executes a subtraction process for the macro-block data using the forward prediction picture data or bidirectional prediction picture data supplied thereto from the motion compensation section 20.

In particular, in the forward prediction mode, the motion compensation section 20 supplies forward prediction picture data to the arithmetic operation section 13 and the arithmetic operation section 19. The arithmetic operation section 13 arithmetically operates forward prediction picture data from the macro-block data supplied thereto to obtain difference data as predictive residuals. Then, the arithmetic operation section 13 signals the difference data to the DCT section 14.

The forward prediction picture data are supplied from the motion compensation section 20 to the arithmetic operation section 19. The arithmetic operation section 19 adds the forward prediction picture data to the arithmetic operation data supplied thereto from the inverse DCT section 18 to locally reproduce the reference image data.

On the other hand, in the bidirectional prediction mode, the motion compensation section 20 supplies bidirectional prediction picture data to the arithmetic operation section 13 and the arithmetic operation section 19. The arithmetic operation section 13 subtracts the bidirectional prediction picture data from the macro-block data supplied thereto to obtain difference data as predictive residuals. Then, the arithmetic operation section 13 signals the difference data to the DCT section 14.

The bidirectional prediction picture data are supplied from the motion compensation section 20 to the arithmetic operation section 19, and the arithmetic operation section 19 adds the bidirectional prediction picture data to the arithmetic operation data supplied thereto from the inverse DCT section 18 to locally reproduce the reference picture data.

Thus, the picture data inputted to the encoder 1 undergo the motion compensation prediction process, DCT transform process and quantization process and supplied as quantized DCT coefficient data to the VLC section 16. The VLC section 16 performs a variable length coding process based on a predetermined conversion table for the quantized DCT coefficient data and signals resulting variable length coded data to a buffer 21. The buffer 21 buffers once and then outputs the variable length coded data supplied thereto.

Now, a process of joining two image data compressed by the Long GOP method to each other at predetermined editing points is described with reference to FIG. 2.

First, for each of editing object compressed image data 1 and editing object compressed image data 2, partial decoding of apportion in the proximity of an editing point is performed. Consequently, partial non-compressed image signal 1 and image signal 2 are obtained. Then, the non-compressed image signal 1 and image signal 2 are joined to each other at the editing points, and an effect is applied to the portion in the proximity of the editing point as occasion demands and then re-encoding is performed. Then, the re-encoded compressed image data are joined to the compressed image data which have not undergone the decoding and re-encoding processes (compressed image data other than the portion for which the partial decoding is performed).

The method described above with reference to FIG. 2 is advantageous in that deterioration of the picture quality by re-encoding can be suppressed locally and the editing processing time can be reduced significantly when compared with those of an alternative method wherein all image data of compressed editing materials are decoded and then the image signals are connected to each other at the editing points, whereafter all of the image signals are re-encoded to obtain edited compressed video data.

However, if the popular encoder 1 having such a popular configuration as described above with reference to FIG. 1 is used to perform editing and re-encoding by such a method as described above with reference to FIG. 2, then this gives rise to a problem that a picture cannot be referred to at a joint between a portion for which re-encoding is performed and another portion for which no re-encoding is performed.

The following method is known as a countermeasure for the problem described. In particular, where compression is performed using a method (Long GOP) which involves predictive encoding between frames, in order to implement editing comparatively simply, the interframe prediction is limited so as to adopt a Closed GOP structure such that a picture is referred to only within a GOP but is not referred to across GOPs.

A case wherein limitation to interframe prediction is applied is described with reference to FIG. 3. FIG. 3 illustrates a list of pictures in a display order in regard to the compressed material image 1 and the compressed material image 2 of an object of editing, partially re-encoded data of compressed pictures in the proximity of the editing points after the editing and data of compressed images of a portion for which re-encoding is not performed in order to indicate a relationship between-interframe prediction and editing. Arrow marks in FIG. 3 indicate a referencing direction of a picture (this similarly applies also to the other figures). In FIG. 3, 15 pictures of BBIBBPBBPBBPBBP of the display order form one GOP, and referencing to a picture is performed only within the GOP. This method inhibits prediction across GOPs thereby to eliminate the relationship of compressed data by prediction between GOPs thereby to allow re-joining of compressed data in a unit of a GOP (determination of a range within which re-encoding is to be performed).

In particular, the range for re-encoding is determined in a unit of one GOP including an editing point for data of the compressed material image 1 and data of the compressed material image 2 which are an object of editing, and the data of the compressed material image 1 and the data of the compressed material image 2 which are an object of editing within the re-encoding ranges determined in a unit of one GOP are decoded to produce signals of the non-compressed material image 1 and the non-compressed material image 2. Then, the signals of the non-compressed material image 1 and the non-compressed material image 2 are joined to each other at the cut editing point, and the material image 1 and the material image 2 joined together in this manner are partly re-encoded to produce compressed image data. Then, the compressed image data are joined to the compressed video data of the portions which have not been re-encoded thereby to produce compressed edited image data.

A Long GOP structure which does not have the Closed GOP structure, that is, a Long GOP structure where an image is referred to across GOPs, is called Open GOP.

SUMMARY OF THE INVENTION

However, according to the editing method wherein the Closed GOP structure wherein prediction across GOPs is inhibited as described hereinabove with reference to FIG. 3 is utilized, limitation is applied to the prediction direction at a starting portion of a GOP. Consequently, the compression efficiency of an image signal is lower than that of the Open GOP structure of a compression method different from the Closed GOP structure which is used popularly.

Accordingly, in order to enhance the compression efficiency of an image signal, it is preferable to utilize the Open GOP structure to perform editing. When re-encoding is performed using the Open GOP structure, a reference picture for prediction of a picture at a joining portion between a portion for which re-encoding is performed and another portion for which no re-encoding is performed, that is, an I picture or a P picture which is referred to in order to encode a B picture in the proximity of a joining portion between a portion for which re-encoding is performed and another portion for which no re-encoding is performed, is required at the portion at which no re-encoding is performed.

FIG. 4 shows in block diagram a configuration of a encoder 31 configured so as to allow a reference picture to be inputted. It is to be noted that, in FIG. 4, like elements to those shown in FIG. 1 are denoted by like reference numerals and overlapping description of them is omitted herein to avoid redundancy. In particular, the encoder 31 of FIG. 4 has a configuration similar to that of the encoder 1 described hereinabove with reference to FIG. 1 except that it additionally includes a switch 41.

The switch 41 receives, as a reference picture thereto, supply of an image signal same as a non-compressed image signal supplied to the image re-arrangement section 11 and further receives supply of reference picture data outputted from the arithmetic operation section 19. The switch 41 thus selects the data to be referred to for a signal to be encoded and supplies the selected data to the motion compensation section 20.

In this manner, since the encoder 31 shown in FIG. 4 additionally has a route of data for acquisition of a reference picture when compared with the encoder 1 described hereinabove with reference to FIG. 1. Therefore, the encoder 31 shown in FIG. 4 can execute re-encoding in editing of compressed image data of the Open Long GOP structure.

For example, where an image signal of a high definition having a great information amount like a HD (High Definition) signal is handled, in order to encode the high definition image signal, a very great number of processes are required, and in order to implement real-time encoding, an LSI for encoding is used. However, since an LSI for encoding normally has such a configuration as described hereinabove with reference to FIG. 1 and the ordinary encoder 1 described hereinabove with reference to FIG. 1 does not have a reference picture inputting function, it cannot edit compressed image data of the Open Long GOP structure. On the other hand, in order to newly produce an LSI configured so as to allow reference picture inputting as described above with reference to FIG. 3 in order to edit compressed image data of the Open GOP structure, a very high cost and time are required.

It is an object of the present invention to provide an information processing apparatus and an information processing method, a recording medium, and a program by which an encoder having no reference picture inputting function can be used to perform re-encoding to implement editing of compressed image data of the Open Long GOP structure.

In order to attain the object described above, according to an embodiment of the present invention, there is provided an information processing apparatus for joining and editing first compressed image data and second compressed image data, including a decoding section for decoding a first predetermined section including a first editing point set to the first compressed image data to produce a first non-compressed image signal and decoding a second predetermined section including a second editing point set to the second compressed image data to produce a second non-compressed image signal, a re-encoding section for joining the first and second non-compressed image signals at the first editing point and the second editing point to produce a third non-compressed image signal and re-encoding the third non-compressed image signal to produce re-encoded image data, a control section for controlling the re-encoding process of the re-encoding section such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section are used, and an editing section for switchably outputting the first and second compressed image data and the re-encoded image data produced by the re-encoding section to produce edited compressed image data.

According to another embodiment of the present invention, there is provided an information processing method for joining and editing first compressed image data and second compressed image data, including a decoding step of decoding a first predetermined section including a first editing point set to the first compressed image data to produce a first non-compressed image signal and decoding a second predetermined section including a second editing point set to the second compressed image data to produce a second non-compressed image signal, a re-encoding step of joining the first and second non-compressed image signals at the first editing point and the second editing point to produce a third non-compressed image signal and re-encoding the third non-compressed image signal to produce re-encoded image data, a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used, and an editing step of switchably outputting the first and second compressed image data and the re-encoded image data produced at the re-encoding step to produce edited compressed image data.

According to a further embodiment of the present invention, there is provided a program for causing a computer to execute a process of joining and editing first compressed image data and second compressed image data, the program including a decoding step of decoding a first predetermined section including a first editing point set to the first compressed image data to produce a first non-compressed image signal and decoding a second predetermined section including a second editing point set to the second compressed image data to produce a second non-compressed image signal, a re-encoding step of joining the first and second non-compressed image signals at the first editing point and the second editing point to produce a third non-compressed image signal and re-encoding the third non-compressed image signal to produce re-encoded image data, a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used, and an editing step of switchably outputting the first and second compressed image data and the re-encoded image data produced at the re-encoding step to produce edited compressed image data.

According to a still further embodiment of the present invention, there is provided a recording medium on which a program for causing a computer to execute a process of joining and editing first compressed image data and second compressed image data is recorded, the program including a decoding step of decoding a first predetermined section including a first editing point set to the first compressed image data to produce a first non-compressed image signal and decoding a second predetermined section including a second editing point set to the second compressed image data to produce a second non-compressed image signal, a re-encoding step of joining the first and second non-compressed image signals at the first editing point and the second editing point to produce a third non-compressed image signal and re-encoding the third non-compressed image signal to produce re-encoded image data, a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used, and an editing step of switchably outputting the first and second compressed image data and the re-encoded image data produced at the re-encoding step to produce edited compressed image data.

In the information processing apparatus, information processing method, recording medium and program, a first predetermined section including a first editing point set to first compressed image data is decoded to produce a first non-compressed image signal, and a second predetermined section including a second editing point set to the second compressed image data is decoded to produce a second non-compressed image signal. Then, the first and second non-compressed image signals are joined at the first editing point and the second editing point to produce a third non-compressed image signal, and the third non-compressed image signal is re-encoded to produce re-encoded image data. The re-encoding process is controlled such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section or at the re-encoding step is used. Then, the first and second compressed image data and the re-encoded image data are switchably outputted to produce edited compressed image data.

With the information processing apparatus, information processing method, recording medium and program, the first compressed image data and the second compressed image data can be joined together at the editing points. Particularly when only data in the proximity of the editing points are decoded and joined together at the editing points and then the joined data are encoded, the re-encoding process is performed such that, as a reference picture to be used for re-encoding each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section or at the re-encoding step are used. Consequently, data compression coded in the Open GOP system can be edited using an encoder having no reference picture inputting function.

According to a yet further embodiment of the present invention, there is provided an information processing apparatus for joining and editing first compressed image data and second compressed image data, including a decoding section for decoding a first predetermined section including a first editing point set to the first compressed image data to produce a first non-compressed image signal and decoding a second predetermined section including a second editing point set to the second compressed image data to produce a second non-compressed image signal, a re-encoding section for joining the first and second non-compressed image signals at the first editing point and the second editing point to produce a third non-compressed image signal and re-encoding the third non-compressed image signal to produce re-encoded image data, and a control section for controlling the re-encoding process of the re-encoding section such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section are used.

According to a yet further embodiment of the present invention, there is provided an information processing method for joining and editing first compressed image data and second compressed image data, including a decoding step of decoding a first predetermined section including a first editing point set to the first compressed image data to produce a first non-compressed image signal and decoding a second predetermined section including a second editing point set to the second compressed image data to produce a second non-compressed image signal, a re-encoding step of joining the first and second non-compressed image signals at the first editing point and the second editing point to produce a third non-compressed image signal and re-encoding the third non-compressed image signal to produce re-encoded image data, and a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used.

In the information processing apparatus, information processing method, recording medium and program, a first predetermined section including a first editing point set to first compressed image data is decoded to produce a first non-compressed image signal, and a second predetermined section including a second editing point set to the second compressed image data is decoded to produce a second non-compressed image signal. Then, the first and second non-compressed image signals are joined at the first editing point and the second editing point to produce a third non-compressed image signal, and the third non-compressed image signal is re-encoded to produce re-encoded image data. The re-encoding process is controlled such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section or at the re-encoding step is used.

With the information processing apparatus, information processing method, recording medium and program, the first compressed image data and the second compressed image data can be joined together at the editing points. Particularly when only data in the proximity of the editing points are decoded and joined together at the editing points and then the joined data are encoded, the re-encoding process is performed such that, as a reference picture to be used for re-encoding each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section or at the re-encoding step are used. Consequently, data compression coded in the Open GOP system can be edited using an encoder having no reference picture inputting function.

According to a yet further embodiment of the present invention, there is provided an information processing apparatus for joining and editing first compressed image data and second compressed image data, including a re-encoding section for joining a first non-compressed image signal obtained by decoding a first predetermined section including a first editing point set to the first compressed image data and a second non-compressed image signal obtained by decoding a second predetermined section including a second editing point set to the second compressed image data at the first editing point and the second editing point to produce a third non-compressed image signal and re-encoding the third non-compressed image signal to produce re-encoded image data, and a control section for controlling the re-encoding process of the re-encoding section such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section are used.

According to a yet further embodiment of the present invention, there is provided an information processing method for joining and editing first compressed image data and second compressed image data, including a re-encoding step of joining a first non-compressed image signal obtained by decoding a first predetermined section including a first editing point set to the first compressed image data and a second non-compressed image signal obtained by decoding a second predetermined section including a second editing point set to the second compressed image data at the first editing point and the second editing point to produce a third non-compressed image signal and re-encoding the third non-compressed image signal to produce re-encoded image data, and a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used.

In the information processing apparatus, information processing method, recording medium and program, a first non-compressed image signal obtained by decoding a first predetermined section including a first editing point set to first compressed image data and a second predetermined section including a second editing point set to second compressed image data are joined at the first editing point and the second editing point to produce a third non-compressed image signal, and the third non-compressed image signal is re-encoded to produce re-encoded image data. The re-encoding process is controlled such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section or at the re-encoding step are used.

With the information processing apparatus, information processing method, recording medium and program, the first compressed image data and the second compressed image data can be joined together at the editing points. Particularly when only data in the proximity of the editing points are decoded and joined together at the editing points and then the joined data are encoded, the re-encoding process is performed such that, as a reference picture to be used for re-encoding each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of the re-encoding section or at the re-encoding step are used. Consequently, data compression coded in the Open GOP system can be edited using an encoder having no reference picture inputting function.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a configuration of an encoder used popularly;

DETAILED DESCRIPTION OF THE PREFERRED EMBODIMENTS

In the following, a preferred embodiment of the present invention is described with reference to the accompanying drawings.

Figure 2:
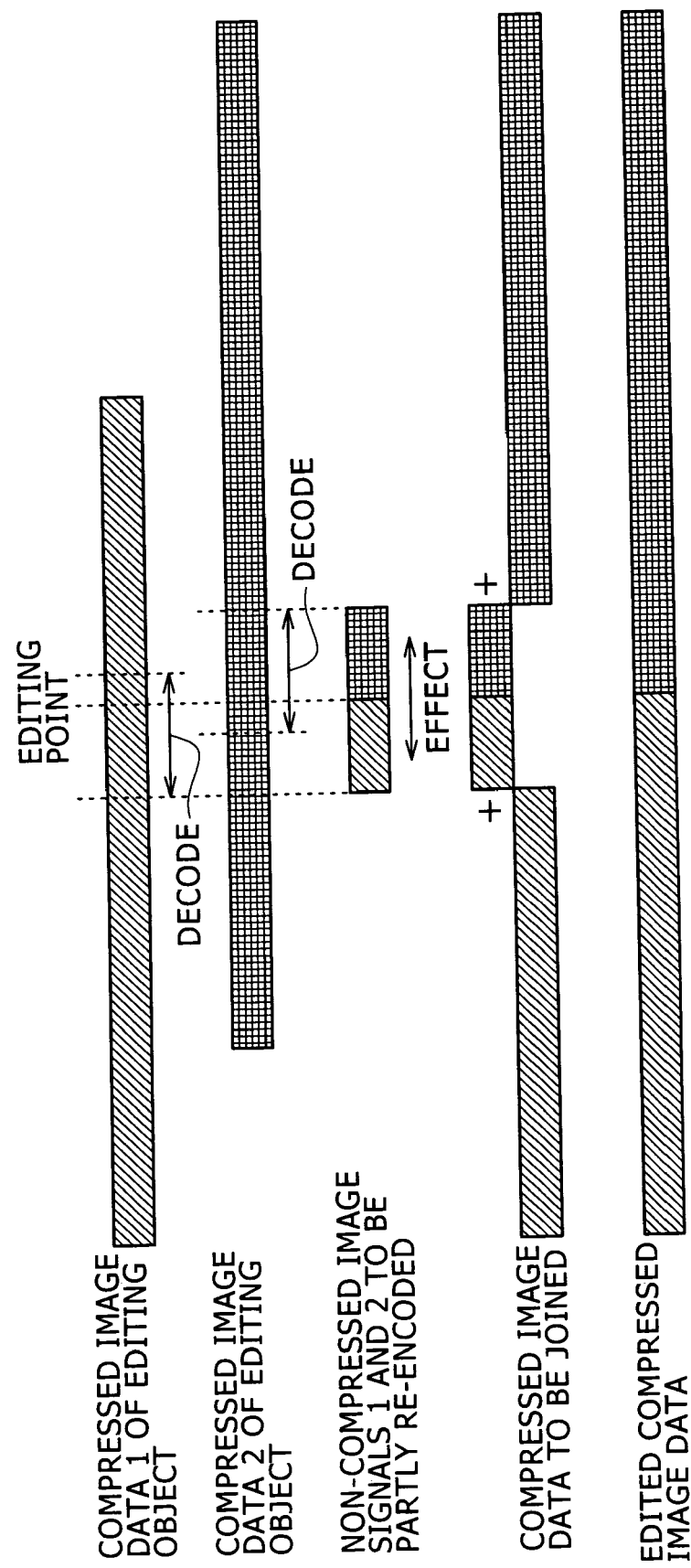
FIG. 2 is a diagrammatic view illustrating editing and partial re-encoding.
Figure 3:
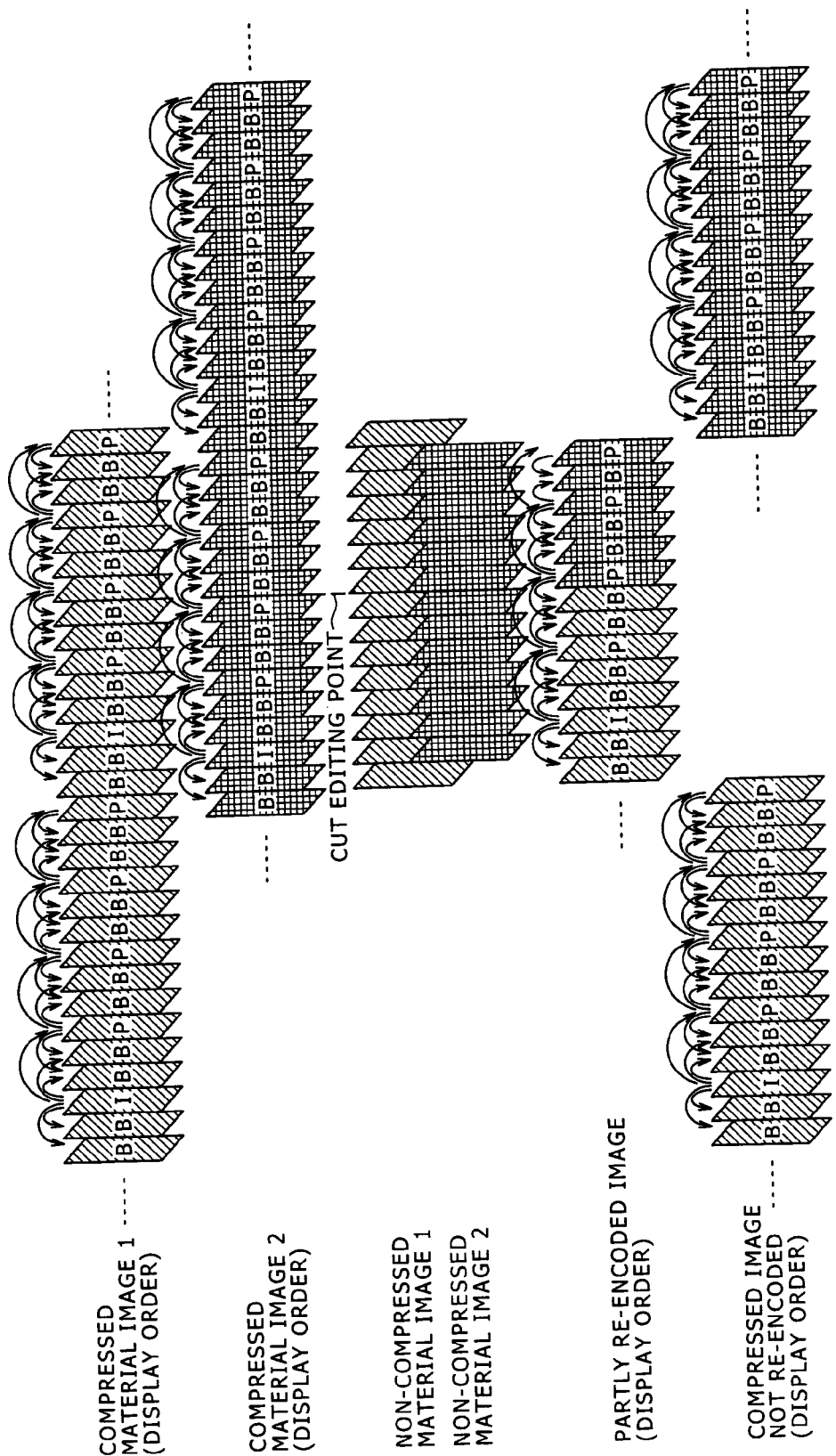
FIG. 3 is a diagrammatic view illustrating editing and partial re-encoding where the Closed GOP structure is used.
Figure 4:
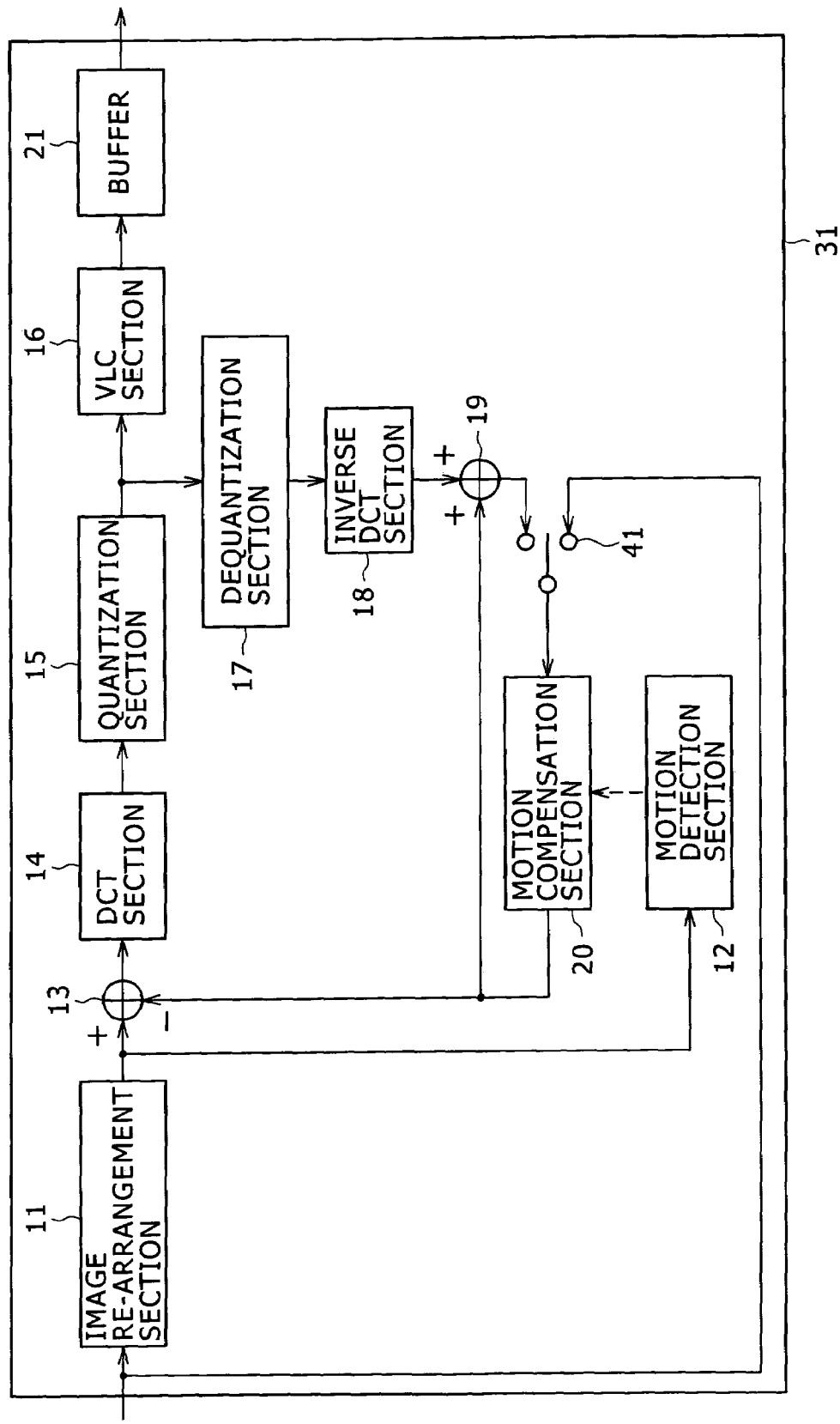
FIG. 4 is a block diagram showing an encoder having a reference picture inputting function.
Figure 5:
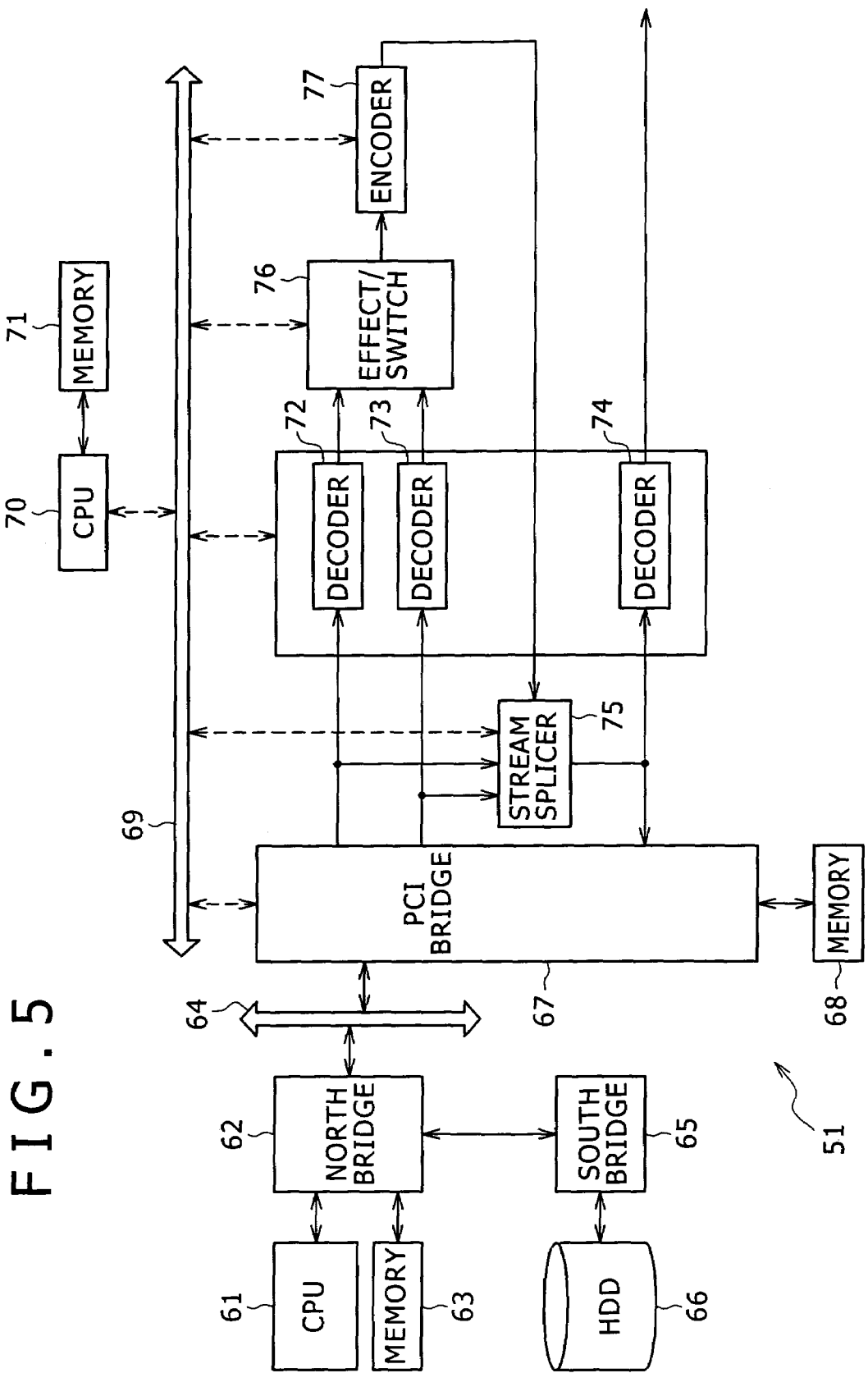
FIG. 5 is a block diagram showing a configuration of an editing apparatus to which the present invention is applied.

FIG. 5 shows in block diagram a hardware configuration of an editing apparatus to which the present invention is applied.

Referring to FIG. 5, the editing apparatus 51 shown includes a CPU (Central Processing Unit) 61 connected to a north bridge 62 and adapted, for example, to control such processes as a reading out process of data stored in a HDD (hard disk drive) 66 and produce and output a command for controlling an editing process to be executed by another CPU 70. The north bridge 62 is connected to a PCI (Peripheral Component Interconnect/Interface) bus 64, and receives supply of data stored in the HDD 66 through a south bridge 65 and supplies the received data to a memory 68 through the PCI bus 64 and a PCI bridge 67. The north bridge 62 is connected also to a memory 63 and supplies and transfers data necessary for processing of the CPU 61 to and from the memory 63.

The memory 63 stores data necessary for processing to be executed by the CPU 61. The south bridge 65 controls writing and reading out of data into and from the HDD 66. The HDD 66 has compression coded materials for editing stored therein.

The PCI bridge 67 controls writing and reading out of data into and from the memory 68 and controls supply of compression coded data to decoders 72 to 74 or a stream splicer 75. Further, the PCI bridge 67 controls transfer of data to and from the PCI bus 64 and a control bus 69. The memory 68 stores compression coded data of materials for editing read out from the HDD 66 or compression coded data after editing supplied from the stream splicer 75 under the control of the PCI bridge 67.

The CPU 70 controls processes to be executed by the PCI bridge 67, the decoders 72 to 74, the stream splicer 75, an effect/switch 76 and an encoder 77 in accordance with a command supplied from the CPU 61 through the north bridge 62, PCI bus 64, PCI bridge 67 and control bus 69. A memory 71 stores data necessary for processing by the CPU 70.

The decoders 72 to 74 decode compression coded data supplied thereto and output a resulting non-coded image signal under the control of the CPU 70. The stream splicer 75 joins compressed image data supplied thereto at a predetermined frame under the control of the CPU 70. The decoders 72 to 74 may otherwise be provided as independent apparatus which are not included in the encoder 1. For example, where the decoder 74 is provided as an independent apparatus, it can receive supply of compressed edited image data produced by editing by a process hereinafter described, decode the compressed edited image data and output resulting data.

The effect/switch 76 changes over between non-compressed image signal outputs supplied thereto from the decoder 72 and the decoder 73, that is, joins non-compressed image signals supplied thereto at a predetermined frame under the control of the CPU 70. Further, the effect/switch 76 applies an effect to the resulting image signal as occasion demands and supplies a resulting signal to the encoder 77. The encoder 77 has an internal configuration similar to that of the encoder 1 described hereinabove with reference to FIG. 1. In particular, the encoder 77 is configured so that it cannot accept an input of a reference picture. Then, the encoder 77 encodes the non-compressed image signal supplied thereto and outputs resulting compression coded compressed image data to the stream splicer 75 under the control of the CPU 70.

Now, operation of the editing apparatus 51 is described.

In the HDD 66, data of a compressed material image 1 and a compressed material image 2 compressed in accordance with the Long Open GOP system are stored.

The CPU 61 controls the south bridge 65 to read out the data of the compression coded compressed material image 1 and the data of the compression coded compressed material image 2, which are used as materials for editing, from the HDD 66 in response to an operation of a user supplied thereto from an operation inputting section not shown and supply the read out data to the memory 68 through the north bridge 62, PCI bus 64 and PCI bridge 67 so as to be stored into the memory 68. Further, the CPU 61 supplies information representing editing points and a command indicating starting of editing to the CPU 70 through the north bridge 62, PCI bus 64, PCI bridge 67 and control bus 69.

It is assumed here that editing is performed such that, to a predetermined editing point of the data of the compressed material image 1, an image succeeding a predetermined editing point of the compressed material image 2 may be joined (that is, the compressed material image 1 and the compressed material image 2 are joined such that the compressed material image 1 precedes to the editing point in time while the compressed material image 2 succeeds the editing point in time).

The CPU 70 determines, based on the information representative of the editing points supplied thereto from the CPU 61, those ranges of the compression coded data of the compressed material image 1 and the compression coded compressed material image 2 within which re-encoding is to be performed. Then, the CPU 70 controls the PCI bridge 67 to supply, from among the data of the compression coded compressed material image 1 stored in the memory 68, those data of the compressed material image 1 which correspond to pictures necessary to perform re-encoding and, from among the data of the compressed material image 2, those data of the compressed material image 2 which correspond to pictures necessary to perform re-encoding to the decoder 73.

Further, at this time, the CPU 70 controls the PCI bridge 67 to supply those of the compression coded compressed material image 1 and the compression coded compressed material image 2 stored in the memory 68 which are within ranges within which re-encoding is not to be performed to the stream splicer 75.

The CPU 70 controls the decoder 72 and the decoder 73 to decode the compression coded data supplied to them.

The decoder 72 and the decoder 73 decode the data supplied thereto under the control of the CPU 70 and supply signals of the compressed material image 1 and the compressed material image 2 obtained by the decoding to the effect/switch 76. The effect/switch 76 joins the non-compressed signals of the compressed material image 1 and the compressed material image 2 at a predetermined cut editing point (also called splice point) and applies an effect to the resulting signal as occasion demands to produce a non-compressed edited image signal for re-encoding under the control of the CPU 70. The produced non-compressed edited image signal for re-encoding is supplied to the encoder 77.

The encoder 77 encodes the non-compressed edited image signal for re-encoding supplied thereto from the effect/switch 76 under the control of the CPU 70.

Then, the image data re-encoded by the encoder 77 are supplied to the stream splicer 75. The stream splicer 75 joins, from among the data of the compressed material image 1 and the compressed material image 2 supplied thereto from the PCI bridge 67, those data of the compressed material image 1 and the compressed material image 2 within the ranges for which re-encoding is not to be performed and the encoded image data supplied thereto from the encoder 77 to each other to produce compressed edited image data under the control of the CPU 70.

Then, the stream splicer 75 supplies the produced compressed edited image data to the PCI bridge 67 so that they are stored into the memory 68, and further supplies the produced compressed edited image data to the decoder 74 so as to be decoded thereby under the control of the CPU 70. The decoded compressed edited image data are outputted from the decoder 74 to a monitor for confirmation of a result of editing so as to be displayed. Further, a base band signal produced by the decoding is outputted to a different apparatus. Where the decoder 74 is formed as an independent apparatus, the apparatus corresponding to the decoder 74 can receive supply of the edited compressed image data produced by the process described above and decode the received edited compressed image data and then output a base band signal produced by the decoding.

If an instruction to store compressed edited image data produced by editing is received from the operation inputting section not shown, then the CPU 61 controls the PCI bridge 67 to read out the compressed edited image data stored in the memory 68 and supply the read out compressed edited image data to the south bridge 65 through the PCI bus 64 and the north bridge 62. Further, the CPU 61 controls the south bridge 65 to supply the compressed edited image data supplied to the same to the HDD 66 so as to be stored into the HDD 66.

Figure 6:
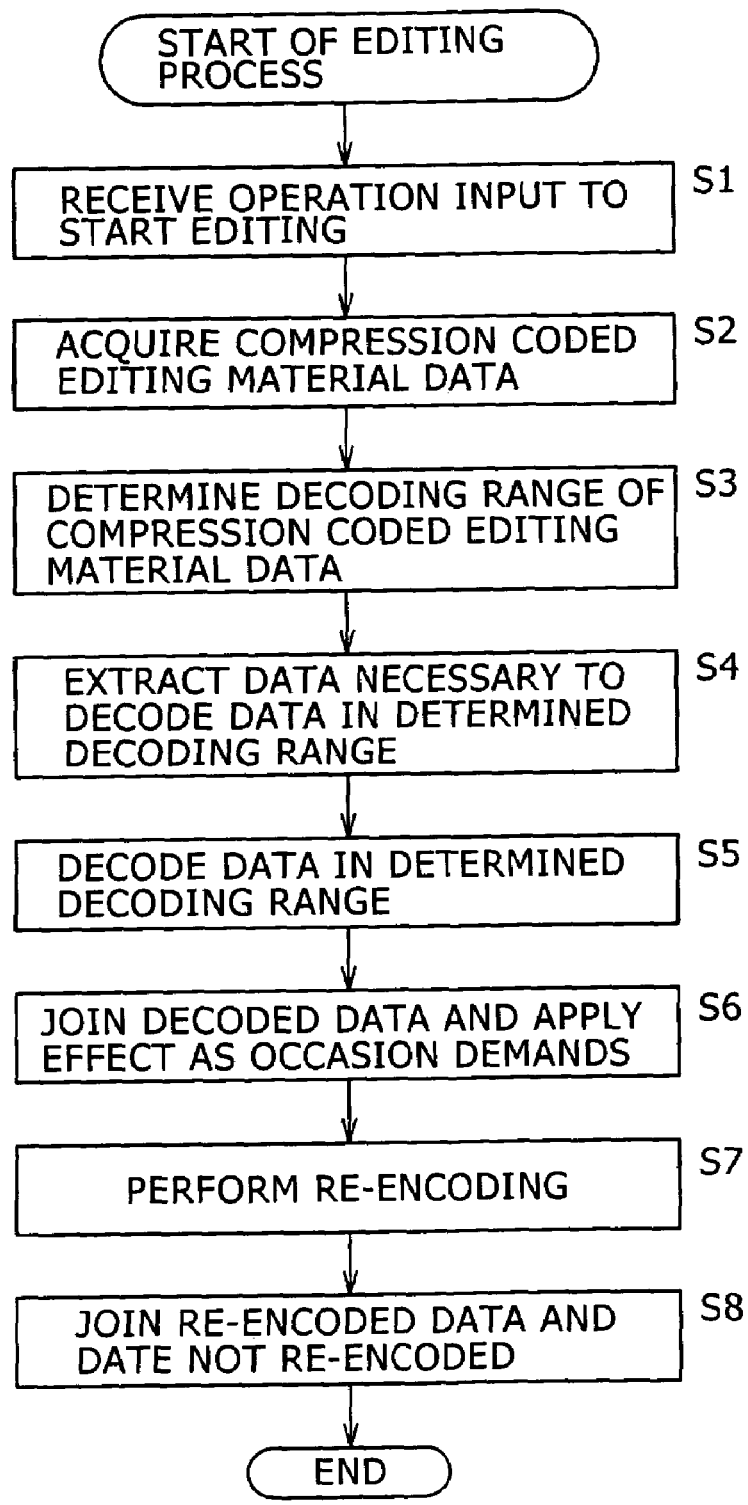
FIG. 6 is a flow chart illustrating an editing process by the editing apparatus of FIG. 5.

Now, an editing process executed by the editing apparatus 51 is described with reference to a flow chart of FIG. 6.

At step S1, the CPU 61 receives an operation input of a user for instruction to start editing from the operation inputting section not shown and controls the south bridge 65 to read out data of compression coded data of two material images which make objects of editing from the HDD 66 in accordance with the operation input of the user supplied thereto from the operation inputting section not shown and supply and store the read out data to and into the memory 68 through the north bridge 62, PCI bus 64 and PCI bridge 67. Further, the CPU 61 controls the south bridge 65 to supply information representative of editing points and a command for instruction to start editing to the CPU 70 through the north bridge 62, PCI bus 64, PCI bridge 67 and control bus 69.

At step S2, the memory 68 acquires the compression coded data of the two editing materials.

At step S3, the CPU 70 determines decoding ranges of the compression coded editing material data based on the information representative of the editing points and the command for instruction to start editing both supplied thereto from the CPU 61.

At step S4, the CPU 70 controls the PCI bridge 67 to extract data necessary for decoding and re-encoding data in the determined decoding ranges from the compression coded data of the two editing materials stored in the memory 68 and supply the extracted data to the decoder 72 and the decoder 73. Further, at this time, the CPU 70 controls the PCI bridge 67 to supply the compression coded editing material data at portions which are not to be re-encoded to the stream splicer 75. The PCI bridge 67 extracts the data necessary for decoding and re-encoding the data in the determined decoding ranges from the compression coded data of the two editing materials stored in the memory 68 and supply the compression coded editing material data in the portions which are not to be re-encoded.

At step S5, the CPU 70 controls the decoder 72 and the decoder 73 to decode the data in the determined decoding ranges. The decoder 72 and the decoder 73 decode the compression coded editing material data supplied thereto and supply resulting data to the effect/switch 76 under the control of the CPU 70.

At step S6, the CPU 70 controls the effect/switch 76 to join the decoded data to each other at the editing points and apply an effect to the resulting data as occasion demands. The effect/switch 76 joins the decoded image materials supplied thereto at the editing points and apply an effect to the resulting data as occasion demands. Then, the resulting data are supplied to the encoder 77.

The data to be supplied to the encoder 77 at step S6 differ depending upon the method of the encoding process of the encoder 77 executed to perform re-encoding without a reference image input. The data necessary to perform re-encoding without a reference image input are hereinafter described.

At step S7, the CPU 70 controls the encoder 77 to re-encode the non-compressed decoded image material obtained by the joining at the editing points using one of three methods hereinafter described without receiving a reference image input. The encoder 77 performs re-encoding of the non-compressed decoded image material obtained by the joint at the editing points and supply compression coded image data produced by the re-encoding to the stream splicer 75 under the control of the CPU 70.

It is to be noted that three methods are available to perform re-encoding without a reference image input at step S7. Details of the three methods are hereinafter described.

At step S8, the CPU 70 controls the stream splicer 75 to join the compression coded image data produced by the re-encoding and the compression coded data of the two material images of the editing materials which have not been re-encoded to each other. The stream splicer 75 joins the compression coded image data produced by the re-encoding and the compression coded data of the two material images of the editing materials which have not been re-encoded to each other to produce compressed edited image data under the control of the CPU 70. Further, the stream splicer 75 supplies the produced compressed edited image data to the PCI bridge 67 so as to be stored into the memory 68 and supplies the compressed edited image data also to the decoder 74 so as to be decoded. The decoded image data are outputted to and displayed by the monitor or the like for confirmation of a result of editing.

It is to be noted that the joining method of data to be executed at step S8 differs depending upon the method used for re-encoding at step S7. The re-encoding method and the corresponding data joining method are hereinafter described. After the process at step S8 is ended, the processing is ended.

Since portions of compressed image data of the Open Long GOP structure in the proximity of editing points are partly decoded and the decoded non-compressed image signals are connected at the predetermined editing points and then the resulting image signal is re-encoded by an encoder having no reference picture input and then joined to the compressed image data at portions at which the image data have not been decoded or re-encoded by the processing described above, editing of the compressed image data of the Open Long GOP structure can be implemented. Consequently, the necessity to newly manufacture an LSI for an encoder having a reference picture inputting function spending a high cost and much time is eliminated.

The following three methods are available for performing re-encoding without a reference picture input.

The first method for performing re-encoding without a reference picture input is to limit, upon re-encoding, the prediction direction at a joining portion to compressed image data which have not been re-encoded thereby to eliminate the prediction from the compressed image data which have not been re-encoded.

In particular, when re-encoding is to be performed, the prediction direction for a B picture at a re-encoding starting portion is limited to the backward direction while the prediction direction of another B picture at a re-encoding ending portion is limited to the forward direction. This eliminates the prediction from compressed image data which have not been re-encoded, and consequently, editing of compressed image data of the Open Long GOP structure can be implemented without the necessity to input a reference picture to the encoder 77.

A process of the editing apparatus 51 where the first method is executed is described with reference to FIG. 7.

Figure 7:
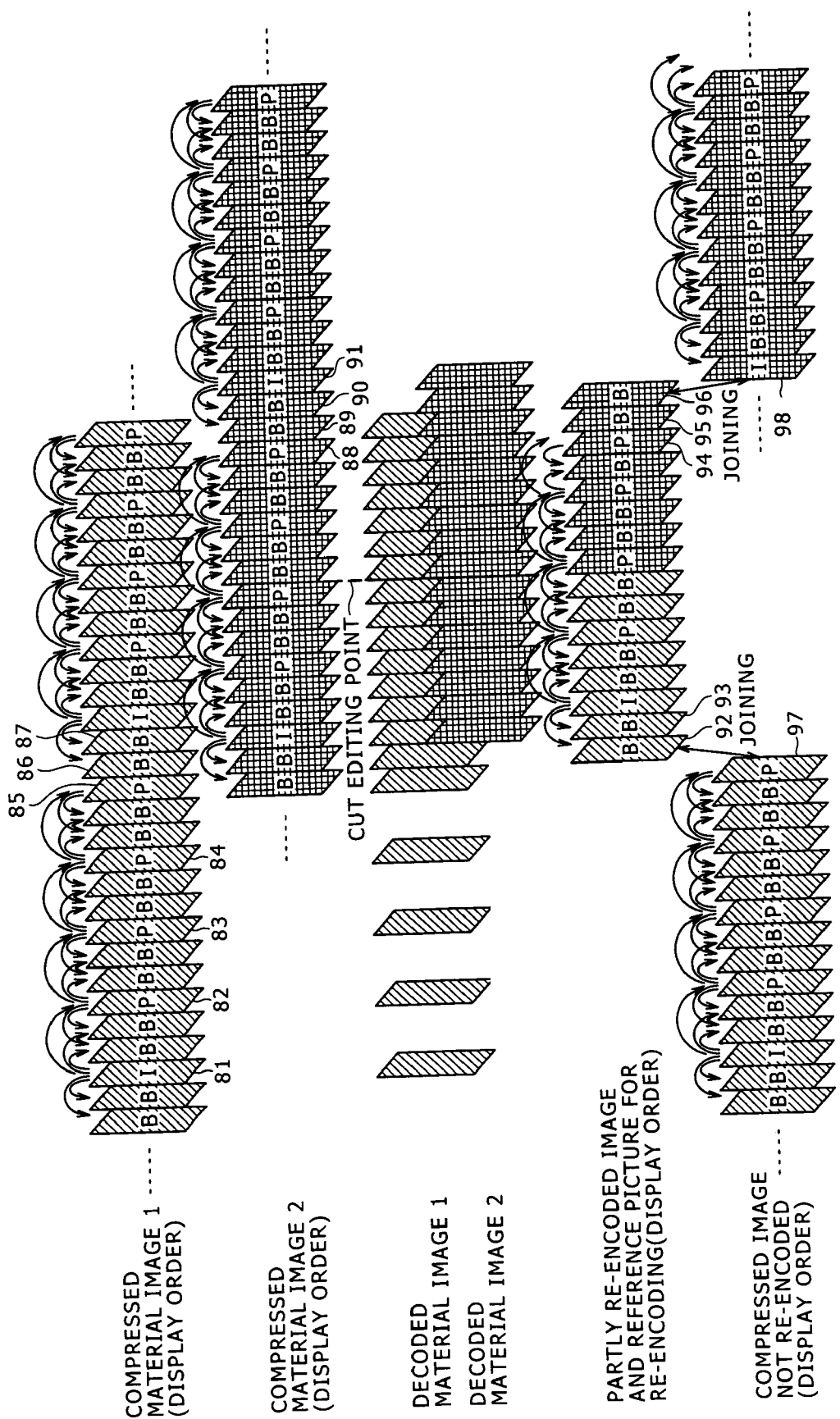
FIG. 7 is a diagrammatic view illustrating limitation to the prediction direction upon encoding by the editing apparatus of FIG. 5.

Compressed data of the compressed material image 1 and the compressed material image 2 compressed by the Open Long GOP method as illustrated in FIG. 7 are stored in the HDD 66. In FIG. 7, the compressed data of the compressed material image 1 and compressed material image 2 are shown in the order of pictures to be displayed (display order).

The CPU 61 controls the south bridge 65 to read out the compressed data of the compressed material image 1 and the compressed data of the compressed material image 2 from the HDD 66 in accordance with an operation input of the user supplied thereto from the operation inputting section not shown and supply and store the read out data to and into the memory 68 through the north bridge 62, PCI bus 64 and PCI bridge 67. Further, the CPU 61 controls the south bridge 65 to supply information representative of editing points and a command for instruction to start editing to the CPU 70 through the north bridge 62, PCI bus 64, PCI bridge 67 and control bus 69.

The CPU 70 determines ranges for which re-encoding is to be performed based on the information representative of the editing points supplied thereto from the CPU 61 so that the last picture within a range of the data of the compression coded compressed material image 1 within which re-encoding is not to be performed may be an I or P picture and the last picture within a region of the data of the compressed material image 2 within which re-encoding is not to be performed may be an I picture. Then, the CPU 70 controls the PCI bridge 67 to supply, from among the compression coded data of the compressed material image 1 stored in the memory 68, those of the data of the compressed material image 1 which correspond to pictures within the range within which re-encoding is to be performed and pictures which need be referred to the decoder 72. Further, the CPU 70 controls the PCI bridge 67 to supply, from among the compression coded data of the compressed material image 2, those of the data of the compressed material image 2 which correspond to pictures within the range within which re-encoding is to be performed and pictures which need be referred to the decoder 73.

In particular, at this time, if a B picture 86 and another B picture 87 are included in the range of the compressed material image 1 within which re-encoding is to be performed, then in order to decode the B picture 86 and the B picture 87, also an I picture 81 and P pictures 82 to 85 are decoded. Similarly, if a B picture 89 and another B picture 90 are included in the range of the compressed material image 2 within which re-encoding is to be performed, then in order to decode the B picture 89 and the B picture 90, also an I picture 91 is decoded. The B picture 89 and the B picture 90 are decoded through reference to a P picture 88 and the I picture 91.

Further, at this time, the CPU 70 controls the PCI bridge 67 to supply those pictures of the compression coded data of the compressed material image 1 and the compressed material image 2 stored in the memory 68 within which no re-encoding is to be performed to the stream splicer 75.

The CPU 70 controls the decoder 72 and the decoder 73 to decode the compression coded data supplied to them.

The decoder 72 and the decoder 73 decode the data supplied thereto under the control of the CPU 70 and supply signals of the compressed material image 1 and the compressed material image 2 obtained by the decoding to the effect/switch 76. The effect/switch 76 joins the non-compressed signals of the compressed material image 1 and the compressed material image 2 at predetermined cut editing points (splice points) to each other and applies an effect as occasion demands to produce a non-compressed edited image signal for re-encoding under the control of the CPU 70. Then, the effect/switch 76 supplies the data at the portion corresponding to the pictures to be re-encoded to the encoder 77.

The encoder 77 encodes the non-compressed edited image signal for re-encoding supplied thereto from the effect/switch 76 under the control of the CPU 70.

At this time, since the encoder 77 does not have a reference picture inputting function, when it is tried to encode a B picture 92 and another B picture 93 for which bidirectional prediction coding is to be performed, the immediately preceding P picture or I picture cannot be used as a reference picture. Similarly, the encoder 77 cannot use the immediately succeeding P picture or I picture as a reference picture in order to encode a B picture 95 and another B picture 96 for which bidirectional predictive coding is to be performed. Accordingly, the CPU 70 controls the encoder 77 to limit the referencing direction in re-encoding of the B pictures.

In other words, the CPU 70 controls the prediction direction of B pictures contiguous to top and end portions of the ranges within which re-encoding is to be performed thereby to eliminate the necessity to use pictures preceding to and succeeding the range within which re-encoding is performed as reference pictures.

Then, the image data re-encoded by the encoder 77 are supplied to the stream splicer 75. The stream splicer 75 joins the data of the compressed material image 1 and the compressed material image 2, supplied from the PCI bridge 67, within the range within which the re-encoding has not been performed from among the data of the compressed material image 1 and the compressed material image 2 and the encoded image data supplied from the encoder 77 to each other to produce compressed edited image data under the control of the CPU 70.

More particularly, the stream splicer 75 joins the streams in the following manner under the control of the CPU 70. In particular, the stream splicer 75 joins the P picture 97 of the compressed material image 1 supplied from the PCI bridge 67 and the B picture 92 of the encoded image data supplied from the encoder 77 such that the P picture 97 and the B picture 92 may be contiguous to each other in the display order. Further, the stream splicer 75 joins the B picture 96 of the encoded image data supplied form the encoder 77 and an I picture 98 of the compressed material image 2 supplied from the PCI bridge 67 to each other such that the B picture 96 and the I picture 98 may be contiguous to each other in the display order.

Then, the stream splicer 75 supplies the compressed edited image data produced thereby to the PCI bridge 67 so as to be stored into the memory 68 and supplies the compressed edited image data to the decoder 74 so as to be decoded under the control of the CPU 70. The decoded image data are outputted to and displayed on the monitor for confirmation of a result of editing or a base band signal produced by the decoding is outputted to the different apparatus. Where the decoder 74 is formed as an independent apparatus, the apparatus corresponding to the decoder 74 can receive supply of the edited compressed image data produced by the processing described above, decode the received edited compressed image data and output the base band signal produced by the decoding.

If an instruction to store compressed edited image data produced through editing is received from the operation inputting section not shown, then the CPU 61 controls the PCI bridge 67 to read out the compressed edited image data stored in the memory 68 and supply the read out compressed edited image data to the south bridge 65 through the PCI bus 64 and the north bridge 62. Further, the CPU 61 controls the south bridge 65 to supply the compressed edited image data supplied to the same to the HDD 66 so as to be stored into the HDD 66.

Now, a prediction direction controlling process executed where encoding is performed by the first method is described with reference to FIG. 8.

At step S31, the CPU 70 controls the effect/switch 76 to supply only those pictures at portions for which re-encoding is to be performed to the encoder 77. The effect/switch 76 supplies only the pictures at the portions for which re-encoding is to be performed to the encoder 77 under the control of the CPU 70. The encoder 77 starts encoding of the data supplied thereto under the control of the CPU 70.

At step S32, the encoder 77 decides whether or not the picture for which encoding is to be executed is a B picture preceding to the first I picture or P picture after re-encoding is started in the display order, that is, a B picture which corresponds to the B picture 92 or the B picture 93 of FIG. 7.

If it is decided at step S32 that the picture for which encoding is-to be executed is a B picture preceding to the first I picture or P picture after re-encoding is started in the display order, then the encoder 77 performs encoding limiting the prediction direction of the corresponding picture to the backward direction at step S33. Thereafter, the processing advances to step S37.

If it is decided at step S32 that the picture for which encoding is to be executed is not a B picture preceding to the first I picture or P picture after re-encoding is started in the display order, then the encoder 77 decides at step S34 whether or not the picture for which encoding is to be executed is a B picture succeeding an I picture or a P picture immediately preceding to the re-encoding ending position in the display order, that is, whether the picture is a B picture which corresponds to the B picture 95 or the B picture 96 of FIG. 7.

If it is decided at step S34 that the picture for which encoding is to be executed is not a B picture succeeding an I picture or a P picture immediately preceding to the re-encoding ending position in the display order, that is, the picture is one of pictures corresponding to the pictures from the I picture succeeding the B picture 93 of FIG. 7 to the P picture 94, then the encoder 77 executes encoding in the prediction direction determined in accordance with an ordinary algorithm at step S35. Thereafter, the processing advances to step S37.

If it is decided at step S34 that the picture for which encoding is to be executed is a B picture succeeding an I picture or a P picture immediately preceding to the re-encoding ending position in the display order, then the encoder 77 performs encoding limiting the prediction direction of the corresponding pictures to the forward direction at step S36.

After the process at step S33, S35 or S36 is completed, the encoder 77 decides at step S37 whether or not the processing for the last picture is completed.

If it is not decided at step S37 that the processing for the last picture is not completed, then the processing returns to step S32 so that the processes at the steps beginning with step S32 are repeated. If it is decided at step S37 that the processing for the last picture is completed, then the processing is ended.

By such processing, re-encoding can be performed controlling the prediction directions of B pictures contiguous to the top and last portions of the ranges for which re-encoding is to be performed. Consequently, even if the compressed material image data for editing are Open GOP data, the necessity to use pictures preceding to and succeeding the ranges for which encoding is to be performed as reference pictures is eliminated.

Now, a second method for performing re-encoding without a reference picture input is described.

The second method for performing re-encoding without a reference picture input is to encode, upon re-encoding, also data corresponding to a reference picture to be used in the proximity of a joining point to compressed image data which are not to be re-encoded, locally decode the encoded data in the inside of an encoder and use the locally decoded data as a reference picture.

In particular, a picture corresponding to a reference picture inputted to the encoder 77 is DCT transformed and quantized first and then dequantized and inverse DCT transformed, and the resulting picture is utilized as a reference picture. Then, the picture utilized as a reference picture is not utilized for editing. (The picture utilized as a reference picture is abandoned without being joined to compressed material image data at a portion which is not re-encoded.)

The reference picture is produced by performing the processing of DCT transform, quantization, dequantization and inverse DCT transform by a number of times greater by once than the number of times by which the processing is performed for a reference picture used upon decoding of edited compressed image data. Accordingly, the reference picture has a picture quality deteriorated by the number of times of the processing of DCT transform, quantization, dequantization and inverse DCT transform greater by once. If a picture having a picture quality deteriorated from that of a reference picture to be used originally as such is used as a reference picture and a difference from the reference picture is encoded, then the picture quality of edited compressed image data is deteriorated. Therefore in order to prevent deterioration of the picture quality of edited compressed image data, the encoder 77 controls the quantization value upon encoding so that the quantization value of a picture to be encoded is set to a low value in order to utilize the picture as a reference picture.

Since the picture to be encoded so as to be utilized as a reference picture is abandoned without being utilized for editing, there is no necessity to take restrictions to the bit rate or a VBV buffer upon encoding into consideration. Accordingly, in encoding of a picture to be utilized as a reference picture, there is no necessity to take the upper limit to the generated code amount into consideration. Therefore, in the second method, the quantization value of a picture to be encoded so as to be utilized as a reference picture is set to a quantization value which is at least lower than a quantization value which is allocated in ordinary rate control and besides is as low as possible. By this, the deterioration of the picture quality can be suppressed to the minimum thereby to prevent deterioration of the picture quality of edited compressed image data. The quantization value of the picture encoded so as to be utilized as a reference picture is preferably set to a minimum value which can be set possibly.

A process of the editing apparatus 51 when the second method is executed is described with reference to FIG. 9.

Figure 9:
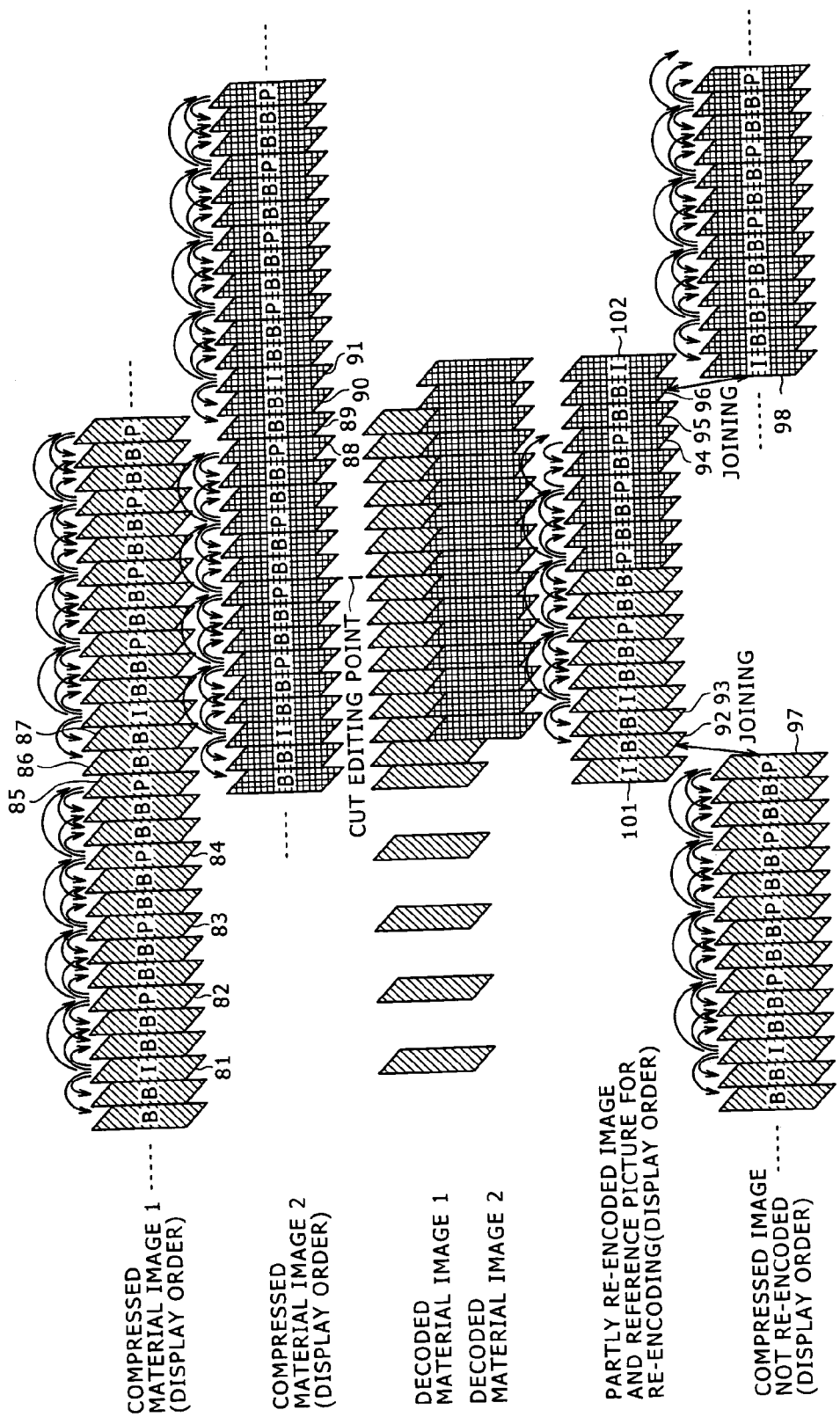
FIG. 9 is a diagrammatic view illustrating a reference picture used for prediction upon encoding by the editing apparatus of FIG. 5.

Compressed data of the compressed material image 1 and the compressed material image 2 compressed by the Open Long GOP method as illustrated in FIG. 9 are stored in the HDD 66. In FIG. 9, the compressed data of the compressed material image 1 and compressed material image 2 are shown in the order of pictures to be displayed (display order).

The CPU 61 controls the south bridge 65 to read out the compressed data of the compressed material image 1 and the compressed data of the compressed material image 2 from the HDD 66 in accordance with an operation input of the user supplied thereto from the operation inputting section not shown and supply the read out data to and into the memory 68 through the north bridge 62, PCI bus 64 and PCI bridge 67. Further, the CPU 61 controls the south bridge 65 to supply information representative of editing points and a command for instruction to start editing to the CPU 70 through the north bridge 62, PCI bus 64, PCI bridge 67 and control bus 69.

The CPU 70 determines ranges of the compression coded data of the compressed material image 1 and the compression coded data of the compressed material image 2 within which re-encoding is to be performed based on the information representative of the editing points supplied thereto from the CPU 61. Then, the CPU 70 controls the PCI bridge 67 to supply, from among the compression coded data of the compressed material image 1 stored in the memory 68, those of the data of the compressed material image 1 which correspond to pictures within the range within which re-encoding is to be performed and pictures which need be referred to the decoder 72. Further, the CPU 70 controls the PCI bridge 67 to supply, from among the compression coded data of the compressed material image 2, those of the data of the compressed material image 2 which correspond to pictures within the range within which re-encoding is to be performed and pictures which need be referred to the decoder 73.

In particular, at this time, if the B picture 86 and the B picture 87 are included in the range of the compressed material image 1 within which re-encoding is to be performed, then in order to decode the B picture 86 and the B picture 87, also the I picture 81 and the P pictures 82 to 85 are decoded. Similarly, if the B picture 89 and the B picture 90 are included in the range of the compressed material image 2 within which re-encoding is to be performed, then in order to decode the B picture 89 and the B picture 90, also the I picture 91 is decoded. The B picture 89 and the B picture 90 are decoded referring to the P picture 88 and the I picture 91.

Further, at this time, the CPU 70 controls the PCI bridge 67 to supply those pictures of the compression coded data of the compressed material image 1 and the compressed material image 2 stored in the memory 68 within which no re-encoding is to be performed to the stream splicer 75.

The CPU 70 controls the decoder 72 and the decoder 73 to decode the compression coded data supplied to the decoder 72 and the decoder 73.

The decoder 72 and the decoder 73 decode the data supplied thereto under the control of the CPU 70 and supply signals of the compressed material image 1 and the compressed material image 2 obtained by the decoding to the effect/switch 76. The effect/switch 76 joins the non-compressed signals of the compressed material image 1 and the compressed material image 2 at predetermined cut editing points (splice points) to each other and applies an effect as occasion demands to produce a non-compressed edited image signal for re-encoding under the control of the CPU 70. Then, the effect/switch 76 supplies the non-compressed edited image signal for re-encoding to the encoder 77 together with re-encoding reference images necessary for re-encoding (in FIG. 9, image data corresponding to an I picture 101 necessary to encode the B picture 92 and the B picture 93 and another I picture 102 necessary to encode the B picture 95 and the B picture 96).

The encoder 77 encodes the non-compressed edited image signal for re-encoding supplied thereto from the effect/switch 76 under the control of the CPU 70.

At this time, in order to encode the B picture 92 and the B picture 93 for which bidirectional predicting coding is to be performed, the encoder 77 must use the immediately preceding I picture or P picture as a reference picture as seen in FIG. 9. Similarly, the encoder 77 must use the immediately succeeding I picture or P picture as a reference picture in order to encode the B picture 95 and the B picture 96 for which bidirectional predictive coding is to be performed.

Accordingly, the encoder 77 encodes a picture immediately preceding to the B picture 92 and the B picture 93 as an I picture (I picture 101 of FIG. 9) and locally decodes the encoded I picture in the inside of the encoder 77, that is, DCT transforms and quantizes and then dequantizes and inverse DCT transforms the encoded I picture to obtain predictive image data. Then, the encoder 77 utilizes the predictive image data as a reference to be used for prediction of the B picture 92 and the B picture 93. Similarly, the encoder 77 encodes a picture immediately succeeding the B picture 95 and the B picture 96 as an I picture (I picture 102 of FIG. 9) and locally decodes the encoded I picture in the inside of the encoder 77 to obtain predictive image data. Then, the encoder 77 utilizes the predictive image data as a reference to be used for prediction of the B picture 95 and the B picture 96.

Further, the encoder 77 encodes the I picture 101 and the I picture 102 of FIG. 9 to be encoded so as to be utilized as a reference picture with a quantization value which is at least lower than a quantization value allocated in ordinary rate control and is as low as possible.

While it is described in connection with FIG. 9 that a reference picture to be used to encode the B picture 92 and the B picture 93 for which bidirectional predictive coding is to be performed and a reference picture to be used to encode the B picture 95 and the B picture 96 for which bidirectional predictive coding is to be performed are all I pictures, naturally the reference pictures may alternatively be P pictures. Where a reference picture is a P picture, in order to encode the reference picture, another reference picture is required. Therefore, where the reference picture is a P picture, the CPU 70 controls so that also a reference picture necessary to encode the reference picture is supplied to and encoded by the encoder 77.

In particular, where a reference picture to be used to encode the B picture 92 and the B picture 93 for which bidirectional predictive coding is to be performed and a reference picture to be used to encode the B picture 95 and the B picture 96 for which bidirectional predictive coding is to be performed are I pictures, the control of processing for supplying data corresponding to a reference picture to the encoder 77 is simplified when compared with that where the reference picture is a P picture.

Then, the image data re-encoded by the encoder 77 are supplied to the stream splicer 75. The stream splicer 75 joins those of the data of the compressed material image 1 and the compressed material image 2 supplied from the PCI bridge 67 which are within ranges within which re-encoding is not to be performed to the encoded image data supplied from the encoder 77 to produce compressed edited image data under the control of the CPU 70.

At this time, the stream splicer 75 abandons the I picture 101 and the I picture 102, which have been encoded in order that they may be utilized as a reference picture, without utilizing them for compressed edited image data.

More particularly, the stream splicer 75 joins the streams in the following manner under the control of the CPU 70. In particular, the stream splicer 75 joins the P picture 97 of the compressed material image 1 supplied from the PCI bridge 67 and the B picture 92 of the encoded image data supplied from the encoder 77 such that the P picture 97 and the B picture 92 may be contiguous to each other in the display order. Further, the stream splicer 75 joins the B picture 96 of the encoded image data supplied form the encoder 77 and an I picture 98 of the compressed material image 2 supplied from the PCI bridge 67 to each other such that the B picture 96 and the I picture 98 may be contiguous to each other in the display order.

Then, the stream splicer 75 supplies the compressed edited image data produced thereby to the PCI bridge 67 so as to be stored into the memory 68 and supplies the compressed edited image data to the decoder 74 so as to be decoded under the control of the CPU 70. The decoded image data are outputted to and displayed on the monitor for confirmation of a result of editing or a base band signal produced by the decoding is outputted to the different apparatus. Where the decoder 74 is formed as an independent apparatus, the apparatus corresponding to the decoder 74 can receive supply of the edited compressed image data produced by the processing described above, decode the received edited compressed image data and output the base band signal produced by the decoding.

If an instruction to store compressed edited image data produced through editing is received from the operation inputting section not shown, then the CPU 61 controls the PCI bridge 67 to read out the compressed edited image data stored in the memory 68 and supply the read out compressed edited image data to the south bridge 65 through the PCI bus 64 and the north bridge 62. Further, the CPU 61 controls the south bridge 65 to supply the compressed edited image data supplied to the same to the HDD 66 so as to be stored into the HDD 66.

Now, a picture type determination process executed where re-encoding is performed by the second method is described with reference to FIG. 10.

At step S51, the CPU 70 controls the effect/switch 76 to supply the pictures at a portion for which re-encoding is to be performed and pictures to be used as a reference picture to the encoder 77. The effect/switch 76 supplies the pictures at the portion for which re-encoding is to be performed and the pictures to be used as a reference picture to the encoder 77 under the control of the CPU 70. The encoder 77 starts encoding of the data supplied thereto under the control of the CPU 70.

At step S52, the encoder 77 decides whether or not one of the pictures supplied thereto is to be used as a reference picture for encoding some other picture, that is, whether one of the pictures supplied is a picture corresponding to the I picture 101 or the I picture 102 which is used as a reference picture for encoding the B pictures 92 and 93 or the B pictures 95 and 96 in the case described hereinabove with reference to FIG. 9. If it is decided at step S52 that the picture for which encoding is to be performed is not a picture to be used as a reference picture, then the processing advances to step S55.

If it is decided at step S52 that the picture for which encoding is to be executed is a picture to be used as a reference picture, then the encoder 77 determines the picture type of the picture for which encoding is to be executed as an I picture or a P picture under the control of the CPU 70 at step S53.

At step S54, the encoder 77 quantizes the I picture or the P picture to be used as a reference picture with a minimum quantization value (preferably a minimum quantization value is used as the quantization value although it is only necessary for the quantization value to be at least lower than a quantization value which is allocated in ordinary rate control). Thereafter, the processing advances to step S57.

If it is decided at step S52 that the picture for which encoding is to be executed is not a picture to be used as a reference picture, then the encoder 77 determines the picture type based on an ordinary algorithm at step S55.

At step S56, the encoder 77 performs ordinary rate control based on, for example, the TM5 to determine a quantization value.

After the process at step S54 or step S56 comes to an end, the encoder 77 performs encoding using the determined quantization value at step S57. Here, the encoder 77 encodes the I picture 101 or the I picture 102 and locally decodes the encoded picture, and uses the decoded picture as a reference picture for the B pictures 92 and 93 or the B pictures 95 and 96. Further, the I picture 101 or the I picture 102 is quantized with a quantization value which is at least lower than a quantization value which is allocated in ordinary rate control and is as low as possible.

At step S58, the encoder 77 decides whether or not the processing of the last picture is completed.

If it is decided at step S58 that the processing of the last picture is not completed as yet, then the processing returns to step S52 so that the processes at the steps beginning with step S52 are repeated. If it is decided at step S58 that the processing of the last picture is completed, then the processing is ended.

By such processing as described above, data of reference images to be used for prediction of B pictures contiguous to the top and last portions within the ranges for which re-encoding is to be performed are supplied to the encoders. Then, since a picture encoded with a quantization value as low as possible and then locally decoded is used as a reference picture and the picture type is determined such that the entire range for which re-encoding is to be performed can be encoded without a reference picture input, even if the compression material image data for editing are of the Open GOP structure, they can be re-encoded by an encoder which does not have a reference picture inputting function.

At this time, since the reference picture to be used for prediction is quantized with a quantization value which is at least lower than a quantization value which is allocated in ordinary rate control and is as low as possible, deterioration of the image quality at the re-encoded portion can be prevented.

Further, after the re-encoding process comes to an end, the picture having been encoded so as to be used as a reference picture is abandoned when encoded compressed material image data are joined to compressed material image data which have not been re-encoded.

Now, a third method for performing re-encoding without a reference picture input is described.

The third method for performing re-encoding without a reference image input is a method wherein, when re-encoding is to be performed, it is executed using one of the first method and the second method described above based on the bit rate of data to be edited.

When it is tried to use the encoder 77 having no reference picture input to implement editing of compressed image data of the Open Long GOP structure, according to the first embodiment described above, the limitation to the prediction direction increases the generated code amount at a portion at which the prediction direction is limited when compared with an alternative case wherein there is no limitation to the prediction direction. However, when compared with the second method, the first method need not take the picture quality deterioration by the DCT transform, quantization, dequantization and inverse DCT transform processes of a picture to be used as a reference picture into consideration. Accordingly, when it is tried to edit compressed image data of a high bit rate, it is preferable to use the first method, but when it is tried to edit compressed image data of a low bit rate, it is preferable to use the second method.

In particular, the CPU 61 compares the bit rate of data to be edited with a predetermined threshold level. Then, if the bit rate is higher than the predetermined threshold level, then the CPU 61 produces a command to execute re-encoding using the first method and outputs the produced command to the CPU 70. However, if the bit rate is lower than the predetermined threshold level, then the CPU 61 produces another command to execute re-encoding using the second method and outputs the produced command to the CPU 70. The CPU 70 controls the effect/switch 76, encoder 77 and stream splicer 75 in accordance with the command supplied thereto from the CPU 61 to execute re-encoding and editing processes by the first method or the second method.

Figure 11:
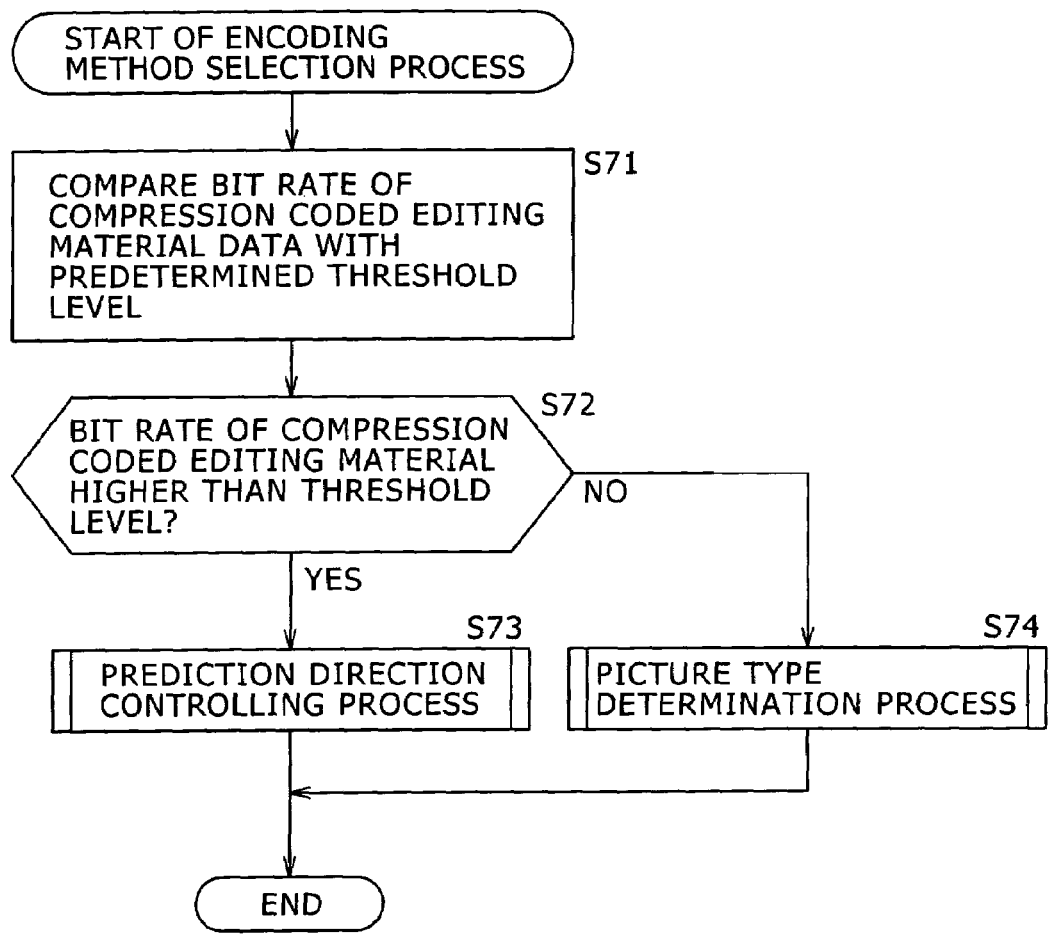
FIG. 11 is a flow chart illustrating an encoding method selection process by the editing apparatus of FIG.5.

Now, an encoding method determination process which is executed where re-encoding is performed using the third method is described with reference to FIG. 11.

At step S71, the CPU 61 compares the bit rate of compression coded editing material data with a predetermined threshold level.

At step S72, the CPU 61 decides whether the bit rate of the compression coded editing material data is higher than the predetermined threshold level.

Figure 8:
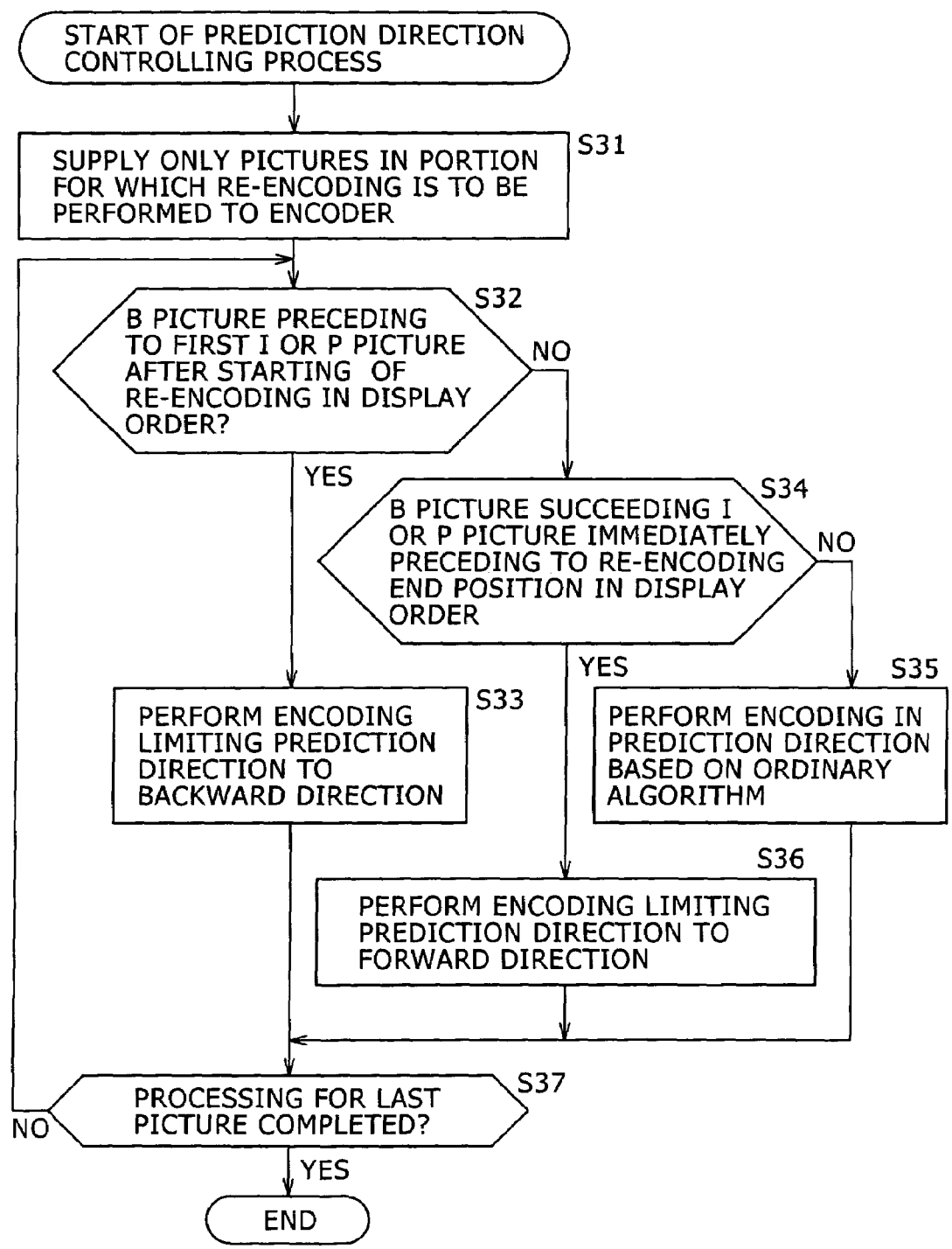
FIG. 8 is a flow chart illustrating a prediction direction controlling process by the editing apparatus of FIG. 5.

If it is decided at step S72 that the bit rate is higher than the predetermined threshold level, then the prediction direction controlling process described hereinabove with reference to FIG. 8 is executed at step S73, whereafter the processing is ended.

Figure 10:
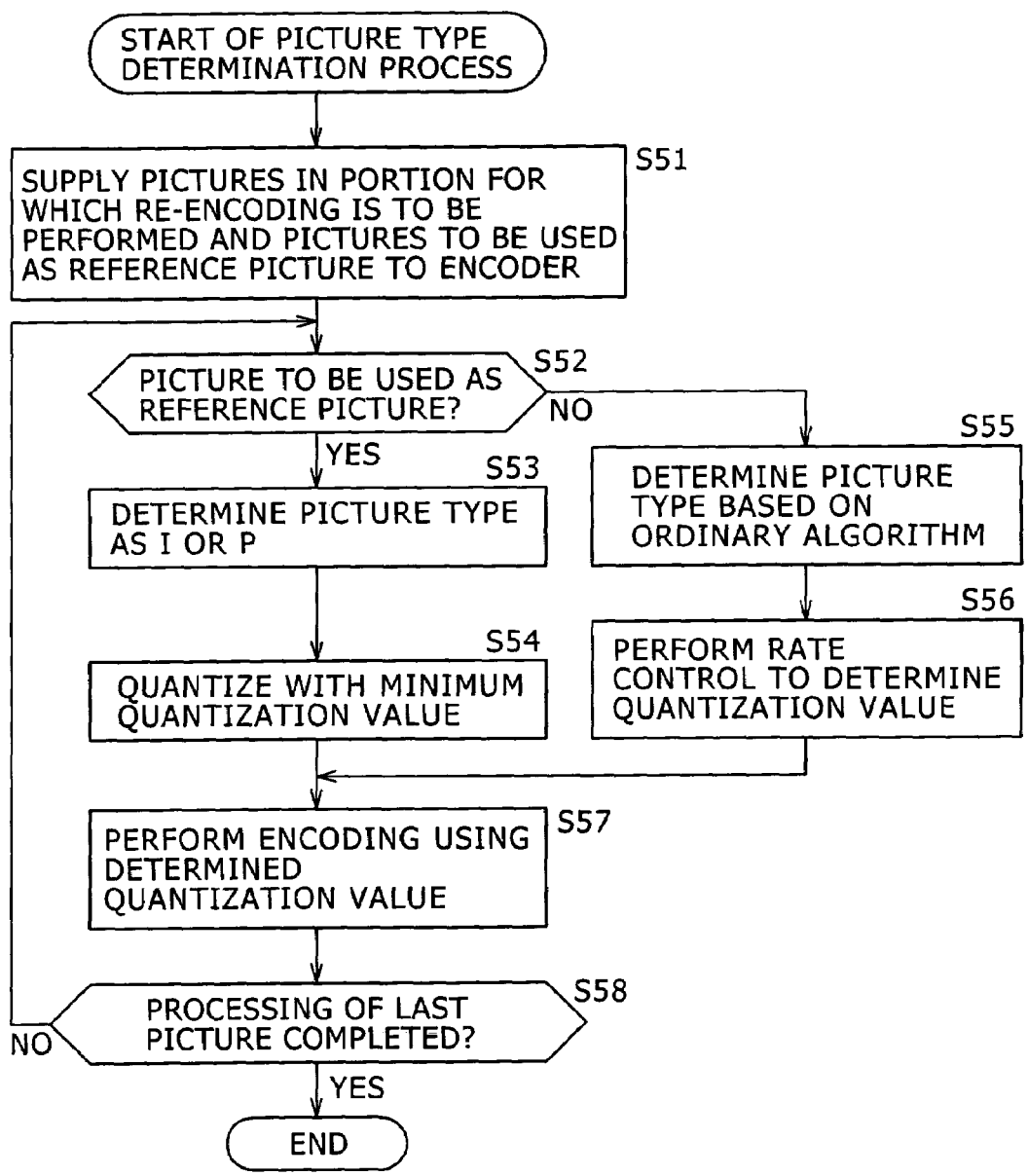
FIG. 10 is a flow chart illustrating a picture type determination process by the editing apparatus of FIG. 5.

However, if it is decided at step S72 that the bit rate is not higher than the predetermined threshold level, then the picture type determination process described hereinabove with reference to FIG. 10 is executed at step S74. Thereafter, the processing is ended.

By such processing as described above, it is possible to perform re-encoding using an encoder having no reference picture input by a method suitable for the bit rate of compression coded editing material data to implement editing of compressed image data of the Open Long GOP structure.

As described above, according to the editing apparatus 51 to which the present invention is applied, editing of compressed image data of the Open Long GOP structure can be implemented using an encoder having no reference picture input. Consequently, since editing of compressed image data of the Open Long GOP structure can be implemented using an encoder used popularly, an LSI of an encoder having a reference picture inputting function need not be manufactured newly any more spending a high cost and much time.

While the series of processes described above can be executed by hardware, it may otherwise be executed by software. Where the series of processes is executed by software, a program which constructs the software is installed from a recording medium into a computer incorporated in hardware for exclusive use or, for example, a general purpose personal computer which can execute various functions by installing various programs. In this instance, for example, the editing apparatus 51 described hereinabove with reference to FIG. 5 is formed from such a personal computer 301 as shown in FIG. 12.

Figure 12:
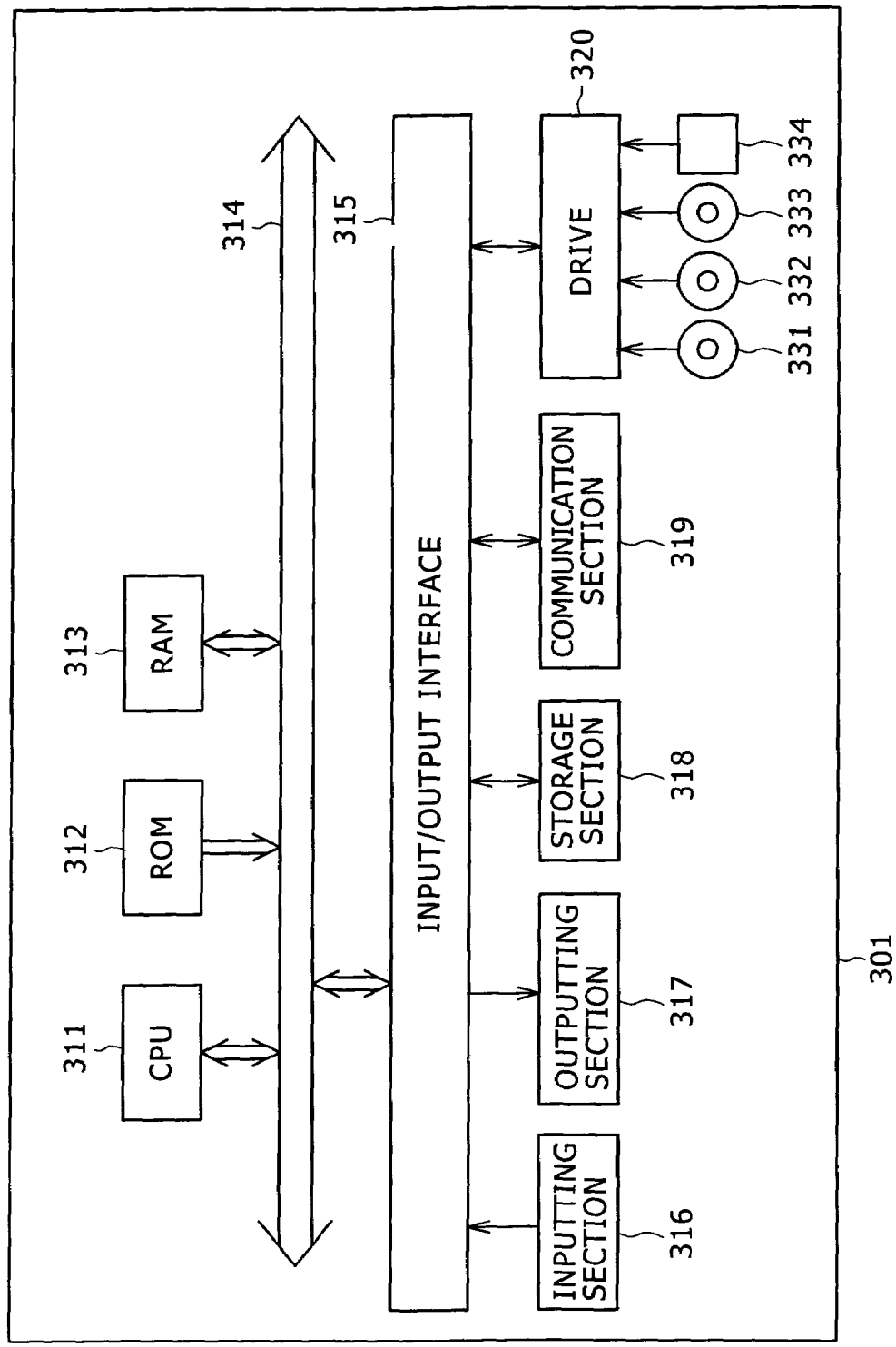
FIG. 12 is a block diagram showing a configuration of a personal computer.

Referring to FIG. 12, a CPU (Central Processing Unit) 311 executes various processes in accordance with a program stored in a ROM (Read Only Memory) 312 or a program loaded from a storage section 318 into a RAM (Random Access Memory) 313. Also data necessary for the CPU 311 to execute the processes are suitably stored into the RAM 313.

The CPU 301, ROM 302 and RAM 313 are connected to one another by a bus 314. Also an input/output interface 315 is connected to the bus 314.

An inputting section 316 including a keyboard, a mouse and so forth, an outputting section 317 including a display unit, a speaker and so forth, a storage section 318 formed from a hard disk or the like, a communication section 319 including a modem, a terminal adapter and so forth are connected to the input/output interface 315. The communication section 319 performs a communication process through a network such as the Internet.

Further, as occasion demands, a drive 320 is connected to the input/output interface 315. A magnetic disk 331, an optical disk 332, a magnet-optical disk 333, a semiconductor memory 334 or the like is suitably loaded into the drive 3200, and a computer program read from the loaded medium is installed into the storage section 318 as occasion demands.

The recording medium from which a program is installed as described above may be formed as a package medium such as, as shown in FIG. 12, a magnetic disk 331 (including a floppy disk), an optical disk 332 (including a CD-ROM (Compact Disk-Read Only Memory) and a DVD (Digital Versatile Disk)), or a magnet-optical disk 333 (including an MD (Mini-Disk) (trademark)), or a semiconductor memory 334 which has the program recorded thereon or therein and is distributed to provide the program to a user separately from an apparatus body. Else, the recording medium is formed as a ROM 312, a hard disk included in the storage section 318 or the like in which the program is stored and which is provided to a user in a state wherein the program is incorporated in an apparatus body in advance.

Further, in the present specification, the steps which describe the program recorded in a recording medium may be but need not necessarily be processed in a time series in the order as described, and include processes which are executed in parallel or individually without being processed in a time series.

Figure 13:
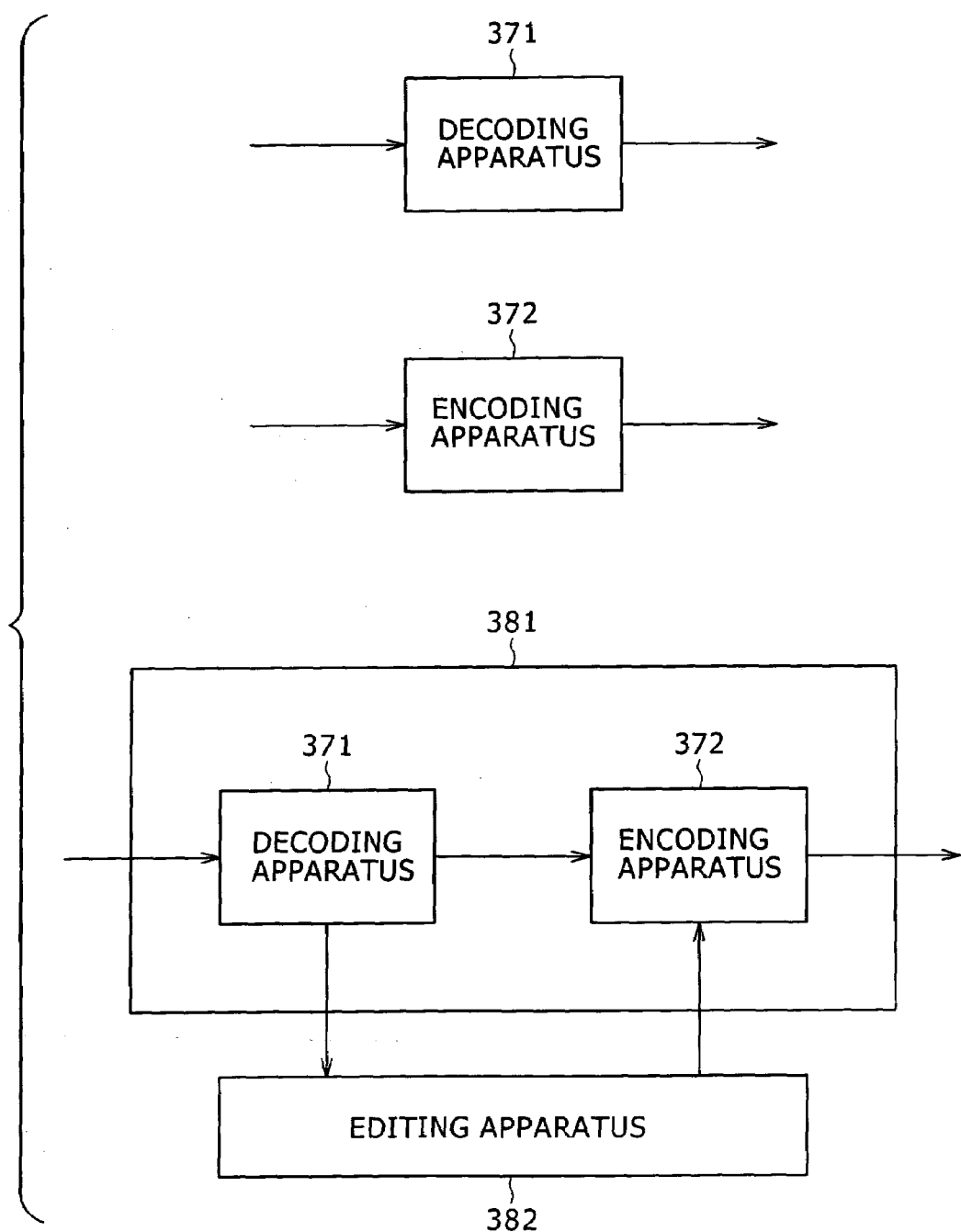
FIG. 13 is a block diagram showing a configuration of different apparatus to which the present invention can be applied.

It is to be noted that, while, in the embodiment described above, the editing apparatus 51 includes a decoder and an encoder, the present invention can be applied also where the decoder and the encoder are each formed as an independent apparatus. For example, as seen in FIG. 13, a decoding apparatus 371 for decoding and converting stream data into a base band signal and an encoding apparatus 372 for encoding and converting a base band signal into stream data may each be formed as an independent apparatus.

In this instance, the decoding apparatus 371 decodes compression coded data of an image material and supplies the decoded data to the encoding apparatus 372. Further, the decoding apparatus 371 can receive supply of compression coded data produced by partial encoding and editing by means of the encoding apparatus 372 by application of the present invention and perform a decoding process of the received compression coded data to convert the data into a base band signal. The stream after editing converted into the base band signal is, for example, supplied to and displayed on a predetermined display apparatus or outputted to another apparatus so that necessary processing may be applied by the apparatus.

Further, the present invention can be applied also where the decoders 72 to 74 in the embodiment described above do not completely decode compression coded data supplied thereto and the corresponding encoder 77 partly encodes the corresponding portion of the data which has been decoded but incompletely.

For example, if the decoders 72 to 74 perform decoding and dequantization only for VLC codes but do not execute inverse DCT transform, then the encoder 77 performs quantization and variable length encoding processes but does not perform a DCT transform process. The present invention can naturally be applied also to an encoder which performs such partial encoding (encoding from an intermediate stage) as just described.

Furthermore, the present invention can be applied also where a base band signal decoded completely by the decoders 72 to 74 is encoded to an intermediate stage by the encoder 77 (for example, although DCT transform and quantization are preformed, a variable length coding processing is not performed) or where, since the decoders 72 to 74 do not perform decoding completely (for example, only decoding and dequantization for VLC codes are performed, but inverse DCT transform is not executed), data encoded to an intermediate stage are further encoded to another intermediate stage by the encoder 77 (for example, although quantization is performed, a variable length coding process is not performed).

Further, the present invention can be applied also where the decoding apparatus 371 shown in FIG. 13 does not completely decode stream data supplied thereto and the corresponding encoding apparatus 372 partially encodes the corresponding portion of the data decoded but incompletely.

For example, when the decoding apparatus 371 performs only decoding and dequantization for VLC codes but does not execute inverse DCT transform, the encoding apparatus 372 performs quantization and variable length coding processes but does not perform a DCT transform process. Naturally, the present invention can be applied also to the decoding process of the decoding apparatus 371 which performs such a partial decoding process (decoding to an intermediate stage) and the encoding process of the encoding apparatus 372 which performs encoding (encoding from the intermediate stage).

Furthermore, the present invention can be applied also where a base band signal decoded completely by the decoding apparatus 371 is encoded to an intermediate stage by the encoding apparatus 372 (for example, although DCT transform and quantization are preformed, a variable length coding processing is not performed) or where, since the decoding apparatus 371 does not perform decoding completely (for example, only decoding and dequantization for VLC codes are performed, but inverse DCT transform is not executed), data encoded to an intermediate stage are further encoded to another intermediate stage by the encoding apparatus 372 (for example, although quantization is performed, a variable length coding process is not performed).

Further, the present invention can be applied also to a transcoder 381 formed from a decoding apparatus 371 which performs such partial decoding (executes part of the step of the decoding process) and an encoding apparatus 372 which performs partial encoding (executes part of the step of an encoding process). Such a transcoder 381 as just described is used where an editing apparatus 382 which performs editing such as, for example, splicing, that is, an editing apparatus which has functions which can be executed by the stream splicer 75 or the effect/switch 76 of the editing apparatus 51 described hereinabove.

Furthermore, while, in the embodiment described hereinabove, the CPU 61 and the CPU 70 are formed in separate elements, they may otherwise be formed as a single CPU which controls the entire editing apparatus 51. Similarly, while, in the embodiment described above, the memory 63 and the memory 71 are formed in separate elements, they may otherwise be formed as a single memory in the editing apparatus 51.

Further, while, in the embodiment described hereinabove, the HDD 66, decoders 72 to 74, stream splicer 75, effect/switch 76 and encoder 77 are connected to one another through bridges and buses so as to be integrated as an editing apparatus, the present invention is not limited to this, but, for example, some of the components mentioned may be connected from the outside by a wire or by radio. Further, the components mentioned may otherwise be connected to one another in any of various connection schemes.

Furthermore, while, in the embodiment described above, compressed materials for editing are stored in a HDD, the present invention is not limited to this, but can be applied also where an editing process is performed using a material for editing recorded on various recording media such as, for example, an optical disk, a magnet-optical disk, a semiconductor memory and a magnetic disk.

Further, the decoders 72 to 74, stream splicer 75, effect/switch 76 and encoder 77 may be carried on the same extension card (for example, a PCI card, a PCI-Express card or the like). However, where the transfer rate between different cards is high owing to a technique of, for example, the PCI-Express, they may otherwise be carried on separate extension cards.

The present invention can be applied not only to information processing apparatus of the MPEG system, but also to information processing apparatus of the type which use an encoding or decoding algorithm similar to that of the MPEG system.

What is claimed is:

1. An information processing apparatus for splicing first compressed image data and second compressed image data, comprising:

a decoding section for decoding a first predetermined section including a first editing point set to the first compressed image data to produce a first non-compressed image signal and decoding a second predetermined section including a second editing point set to the second compressed image data to produce a second non-compressed image signal;

a re-encoding section for joining the first and second non-compressed image signals at the first editing point and the second editing point to produce a third non-compressed image signal and re-encoding the third non-compressed image signal to produce re-encoded image data;

a control section for controlling the re-encoding process of said re-encoding section such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of said re-encoding section are used; and an editing section for switchably outputting the first and second compressed image data and the re-encoded image data produced by said re-encoding section to produce edited compressed image data.

2. The information processing apparatus according to claim 1, wherein said control section controls the re-encoding process of said re-encoding section such that the reference picture to be used to re-encode each of the B pictures positioned at the top and the last of the third non-compressed image signal in the display order is re-encoded using a quantization value lower than a quantization value which is allocated in rate control.

3. The information processing apparatus according to claim 1, wherein said control section controls the re-encoding process of said re-encoding section such that the reference picture to be used to re-encode each of the B pictures positioned at the top and the last of the third non-compressed image signal in the display order is re-encoded using a minimum quantization value.

4. The information processing apparatus according to claim 1, wherein said editing section joins the first compressed image data and the re-encoded image data at a position of the re-encoded image data produced by said re-encoding section which does not include the reference picture.

5. The information processing apparatus according to claim 1, wherein said editing section joins the second compressed image data and the re-encoded image data at a position of the re-encoded image data produced by said re-encoding section which does not include the reference picture.

6. The information processing apparatus according to claim 1, further comprising a comparison section for comparing the bit rate of the first coded bit stream and the second coded bit stream with a predetermined threshold level, said control section controlling said re-encoding section such that the referencing prediction direction of the B picture positioned at the top of the third non-compressed image signal in the display order is set to the backward direction and the referencing prediction direction of the B picture positioned at the last of the third non-compressed image signal in the display order is set to the forward direction to perform the re-encoding process.

7. The information processing apparatus according to claim 6, wherein said control section controls the re-encoding process of said re-encoding section such that, if it is decided by said comparison section that the bit rate is lower than the predetermined threshold level, as the reference picture to be used to re-encode each of the B pictures positioned at the top and the last of the third non-compressed image signal in the display order, data obtained by re-encoding the reference picture as an I picture or a P picture and decoding the re-encoded I picture or P picture are used.

8. The information processing apparatus according to claim 7, wherein said editing section joins the first compressed image data and the re-encoded image data at a position of the re-encoded image data produced by said re-encoding section which does not include the reference picture.

9. The information processing apparatus according to claim 7, wherein said editing section joins the second compressed image data and the re-encoded image data at a position of the re-encoded image data produced by said re-encoding section which does not include the reference picture.

10. An information processing method for splicing first compressed image data and second compressed image data, comprising:
  a decoding step of decoding a first predetermined section including a first editing point set to the first compressed image data to produce a first non-compressed image signal and decoding a second predetermined section including a second editing point set to the second compressed image data to produce a second non-compressed image signal;
  a re-encoding step of joining the first and second non-compressed image signals at the first editing point and the second editing point to produce a third non-compressed image signal and re-encoding the third non-compressed image signal to produce re-encoded image data;
  a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used; and
  an editing step of switchably outputting the first and second compressed image data and the re-encoded image data produced at the re-encoding step to produce edited compressed image data.

11. A computer readable storage medium having stored thereon a program used to execute a method of splicing first compressed image data and second compressed image data is recorded method, the method comprising:
  decoding a first predetermined section including a first editing point set to the first compressed image data to produce a first non-compressed image signal and decoding a second predetermined section including a second editing point set to the second compressed image data to produce a second non-compressed image signal;
  joining the first and second non-compressed image signals at the first editing point and the second editing point to produce a third non-compressed image signal and re-encoding the third non-compressed image signal to produce re-encoded image data;
  controlling the re-encoding process at such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used; and
  switchably outputting the first and second compressed image data and the re-encoded image data produced at the re-encoding step to produce edited compressed image data.

12. An information processing apparatus for splicing first compressed image data and second compressed image data, comprising:
  a decoding section for decoding a first predetermined section including a first editing point set to the first compressed image data to produce a first non-compressed image signal and decoding a second predetermined section including a second editing point set to the second compressed image data to produce a second non-compressed image signal;
  a re-encoding section for joining the first and second non-compressed image signals at the first editing point and the second editing point to produce a third non-compressed image signal and re-encoding the third non-compressed image signal to produce re-encoded image data; and
  a control section for controlling the re-encoding process of said re-encoding section such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of said re-encoding section are used.

13. An information processing method for splicing first compressed image data and second compressed image data, comprising:
  a decoding step of decoding a first predetermined section including a first editing point set to the first compressed image data to produce a first non-compressed image signal and decoding a second predetermined section including a second editing point set to the second compressed image data to produce a second non-compressed image signal;
  are-encoding step of joining the first and second non-compressed image signals at the first editing point and the second editing point to produce a third non-compressed image signal and re-encoding the third non-compressed image signal to produce re-encoded image data; and a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used.

14. An information processing apparatus for splicing first compressed image data and second compressed image data, comprising:

a re-encoding section for joining a first non-compressed image signal obtained by decoding a first predetermined section including a first editing point set to the first compressed image data and a second non-compressed image signal obtained by decoding a second predetermined section including a second editing point set to the second compressed image data at the first editing point and the second editing point to produce a third non-compressed image signal and re-encoding the third non-compressed image signal to produce re-encoded image data; and a control section for controlling the re-encoding process of said re-encoding section such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture in the inside of said re-encoding section are used.

15. An information processing method for splicing first compressed image data and second compressed image data, comprising:

a re-encoding step of joining a first non-compressed image signal obtained by decoding a first predetermined section including a first editing point set to the first compressed image data and a second non-compressed image signal obtained by decoding a second predetermined section including a second editing point set to the second compressed image data at the first editing point and the second editing point to produce a third non-compressed image signal and re-encoding the third non-compressed image signal to produce re-encoded image data; and a control step of controlling the re-encoding process at the re-encoding step such that, as a reference picture to be used to re-encode each of B pictures positioned at the top and the last of the third non-compressed image signal in a display order, data obtained by re-encoding the third non-compressed image signal corresponding to each of the reference pictures as an I picture or a P picture and decoding the re-encoded I picture or P picture at the re-encoding step are used.

* * * * *